US011104248B2

(12) United States Patent
Scott et al.

(10) Patent No.: US 11,104,248 B2
(45) Date of Patent: Aug. 31, 2021

(54) RAIL ASSEMBLY FOR A VEHICLE

(71) Applicant: Ford Global Technologies, LLC, Dearborn, MI (US)

(72) Inventors: Glenn Scott, Dexter, MI (US); Alan George Dry, Grosse Pointe Woods, MI (US); Eric Morse, Plymouth, MI (US); Joseph Michael Kish, Canton, MI (US); Macit Aktas, Windsor (CA); Joshua Gauthier, South Lyon, MI (US); Cung K. Chieu, Tecumseh (CA); Robert Clayton Caldwell, Royal Oak, MI (US); Matthew Schwope, Belleville, MI (US); Changwei Xie, Novi, MI (US); Johnathan Andrew Line, Northville, MI (US); Ray Kurlonko, Ypsilanti, MI (US); Arya Sabeti, Dearborn, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 128 days.

(21) Appl. No.: 16/595,829

(22) Filed: Oct. 8, 2019

(65) Prior Publication Data

US 2021/0101506 A1 Apr. 8, 2021

(51) Int. Cl.
*B60N 2/08* (2006.01)
*B60N 2/02* (2006.01)
*B60P 7/08* (2006.01)
*F16H 25/04* (2006.01)
*F16H 19/04* (2006.01)

(52) U.S. Cl.
CPC ......... *B60N 2/0232* (2013.01); *B60N 2/0825* (2013.01); *B60N 2/0875* (2013.01); *B60P 7/0815* (2013.01); *F16H 19/04* (2013.01); *F16H 25/04* (2013.01); *B60N 2002/0236* (2013.01)

(58) Field of Classification Search
CPC ...... B60N 2/0232; B60N 2/0236; B60N 2/08; B60N 2/0812; B60N 2/0825; B60N 2/0862; B60N 2/0875; B60N 2002/0236; B60P 7/0815; B64D 11/06
USPC ............................... 248/420, 424, 429, 430; 296/65.13–65.15; 297/344, 344.1
See application file for complete search history.

(56) References Cited

U.S. PATENT DOCUMENTS

| 3,381,927 | A | * | 5/1968 | Stephen Stamates ....................... B64D 11/0696 248/429 |
| 4,949,931 | A | * | 8/1990 | Fujiwara ............... B60N 2/0292 248/429 |
| 5,156,437 | A | * | 10/1992 | Hayakawa ............. B60N 2/071 297/335 |
| 5,938,164 | A | | 8/1999 | Kargol et al. |

(Continued)

*Primary Examiner* — Jonathan Liu
*Assistant Examiner* — Guang H Guan
(74) *Attorney, Agent, or Firm* — David Coppiellie; Price Heneveld LLP

(57) ABSTRACT

A rail assembly includes a track assembly defining an interior channel, a shuttle assembly received within the interior channel, and a carriage assembly coupled to the track assembly. The shuttle assembly includes a lock assembly. The carriage assembly includes a trigger assembly. The trigger assembly includes a trigger cam and an actuator cam coupled to the trigger cam. The actuator cam actuates the carriage assembly between locked and unlocked configurations relative to the track assembly.

20 Claims, 14 Drawing Sheets

(56) References Cited

U.S. PATENT DOCUMENTS

| | | | |
|---|---|---|---|
| 6,629,721 B1 | 10/2003 | Macey | |
| 6,762,579 B2 * | 7/2004 | Babcock | B60N 2/06 |
| | | | 248/429 |
| 7,152,897 B2 * | 12/2006 | Bonnes | B60N 2/072 |
| | | | 296/35.1 |
| 7,188,805 B2 | 3/2007 | Henley et al. | |
| 7,429,190 B2 | 9/2008 | Hueber | |
| 8,066,248 B2 * | 11/2011 | Christensen | B64D 11/0696 |
| | | | 248/429 |
| 8,245,994 B2 | 8/2012 | Yamada et al. | |
| 8,382,057 B2 | 2/2013 | Napau et al. | |
| 8,899,545 B2 * | 12/2014 | Blees | B64C 1/20 |
| | | | 248/503 |
| 9,376,044 B2 | 6/2016 | Fujita et al. | |
| 10,759,311 B2 * | 9/2020 | Petit | B60N 2/0715 |
| 10,919,474 B2 * | 2/2021 | Dry | B60R 16/027 |
| 11,027,628 B2 * | 6/2021 | Dry | E05G 1/08 |
| 2011/0062285 A1 | 3/2011 | Herzog et al. | |
| 2013/0200244 A1 | 8/2013 | Werner et al. | |
| 2020/0346564 A1 * | 11/2020 | Dry | B60R 7/04 |
| 2021/0101506 A1 * | 4/2021 | Scott | B60N 2/0232 |

\* cited by examiner

RAIL ASSEMBLY FOR A VEHICLE

FIELD OF THE DISCLOSURE

The present disclosure generally relates to a rail assembly. More specifically, the present disclosure relates to a rail assembly for a vehicle.

BACKGROUND OF THE INVENTION

Rail assemblies have been utilized for movably mounting seating assemblies to vehicles. However, additional solutions are needed that provide enhancements to the operation of the rail assembly.

SUMMARY OF THE INVENTION

According to a first aspect of the present disclosure, a rail assembly includes a track assembly, a shuttle assembly, and a carriage assembly. The track assembly defines an interior channel. The shuttle assembly is received within the interior channel. The shuttle assembly includes a lock assembly. The carriage assembly is coupled to the track assembly. The carriage assembly includes a trigger assembly. The trigger assembly includes a trigger cam and an actuator cam. The actuator cam is coupled to the trigger cam. The actuator cam actuates the carriage assembly between locked and unlocked configurations relative to the track assembly.

Embodiments of the first aspect of the present disclosure can include any one or a combination of the following features:
- the shuttle assembly includes a motor, a driveshaft that extends from the motor, a pinion gear that is positioned at an end of the driveshaft that is opposite the motor, a drive gear that meshes with the pinion gear on a first side of the drive gear, and a spur gear that is positioned on a second side of the drive gear;
- the track assembly includes a drive rack that is engaged by the spur gear of the shuttle assembly;
- rotational motion of the trigger cam is translated into rotational motion of the actuator cam;
- the trigger cam and the actuator cam are coupled to one another by a cam rod;
- the actuator cam includes a major axis and a minor axis such that the actuator cam is oblong in shape;
- the minor axis of the actuator cam corresponds to the locked configuration and the major axis corresponds to the unlocked configuration;
- the lock assembly includes a body and a plunger, wherein the plunger is movable between extended and retracted positions relative to the body;
- the plunger is biased to the extended position;
- contact between the plunger and the trigger cam initiates rotational motion of the trigger cam in one of a clockwise and a counter-clockwise direction about a rotation axis that is defined by the cam rod;
- actuation of the shuttle assembly along the track assembly after contact has been made between the plunger and the trigger cam results in physical containment of the trigger cam between the plunger and a guide tab of the carriage assembly;
- the physical confinement of the trigger cam between the plunger and the guide tab maintains the carriage assembly in the unlocked configuration, wherein the physical interaction between the plunger and the carriage assembly enables movement of the shuttle assembly along the track assembly to be translated into corresponding movement of the carriage assembly along the track assembly;
- the track assembly includes a guide protrusion and a retention lip;
- the carriage assembly includes a support bracket that extends to engage with the guide protrusion of the track assembly;
- the support bracket includes a support plate, a guide plate, and support arms that extend between the support plate and the guide plate, wherein the support arms define apertures between adjacent support arms;
- the carriage assembly includes a lock plate that extends to engage with the retention lip of the track assembly;
- the lock plate includes lock arms positioned within the apertures defined by the support arms, wherein the lock arms engage with the retention lip to retain the carriage assembly in a given position along the track assembly; and
- the lock arms include arcuate ends that engage with an underside of the retention lip, wherein the retention lip includes retention ribs that define recesses therebetween that receive the arcuate ends of the lock arms.

According to a second aspect of the present disclosure, a rail assembly includes a track assembly, a shuttle assembly, and a carriage assembly. The track assembly defines an interior channel. The track assembly includes a guide protrusion and a retention lip. The shuttle assembly is received within the interior channel. The shuttle assembly includes a lock assembly. Thee lock assembly includes a body and a plunger. The plunger is movable between extended and retracted positions relative to the body. The carriage assembly is coupled to the track assembly. The carriage assembly includes a trigger assembly. The trigger assembly includes a trigger cam and an actuator cam. The actuator cam is coupled to the trigger cam by a cam rod. Rotational motion of the trigger cam is translated into rotational motion of the actuator cam. The actuator cam includes a major axis and a minor axis such that the actuator cam is oblong in shape. The actuator cam actuates the carriage assembly between locked and unlocked configurations relative to the track assembly. The minor axis of the actuator cam corresponds to the locked configuration and the major axis corresponds to the unlocked configuration.

Embodiments of the second aspect of the present disclosure can include any one or a combination of the following features:
- the carriage assembly includes a support bracket that extends to engage with the guide protrusion of the track assembly, the support bracket includes a support plate, a guide plate, and support arms extending between the support plate and the guide plate, wherein the support arms define apertures between adjacent support arms, the carriage assembly also includes a lock plate that extends to engage with the retention lip of the track assembly, the lock plate includes lock arms positioned within the apertures defined by the support arms, wherein the lock arms engage with the retention lip to retain the carriage assembly in a given position along the track assembly, wherein the lock arms include arcuate ends that engage with an underside of the retention lip, and wherein the retention lip include retention ribs that define recesses therebetween that receive the arcuate ends of the lock arms.

These and other aspects, objects, and features of the present disclosure will be understood and appreciated by

BRIEF DESCRIPTION DRAWINGS

DETAILED DESCRIPTION OF THE PREFERRED EMBODIMENTS

Figure 1:
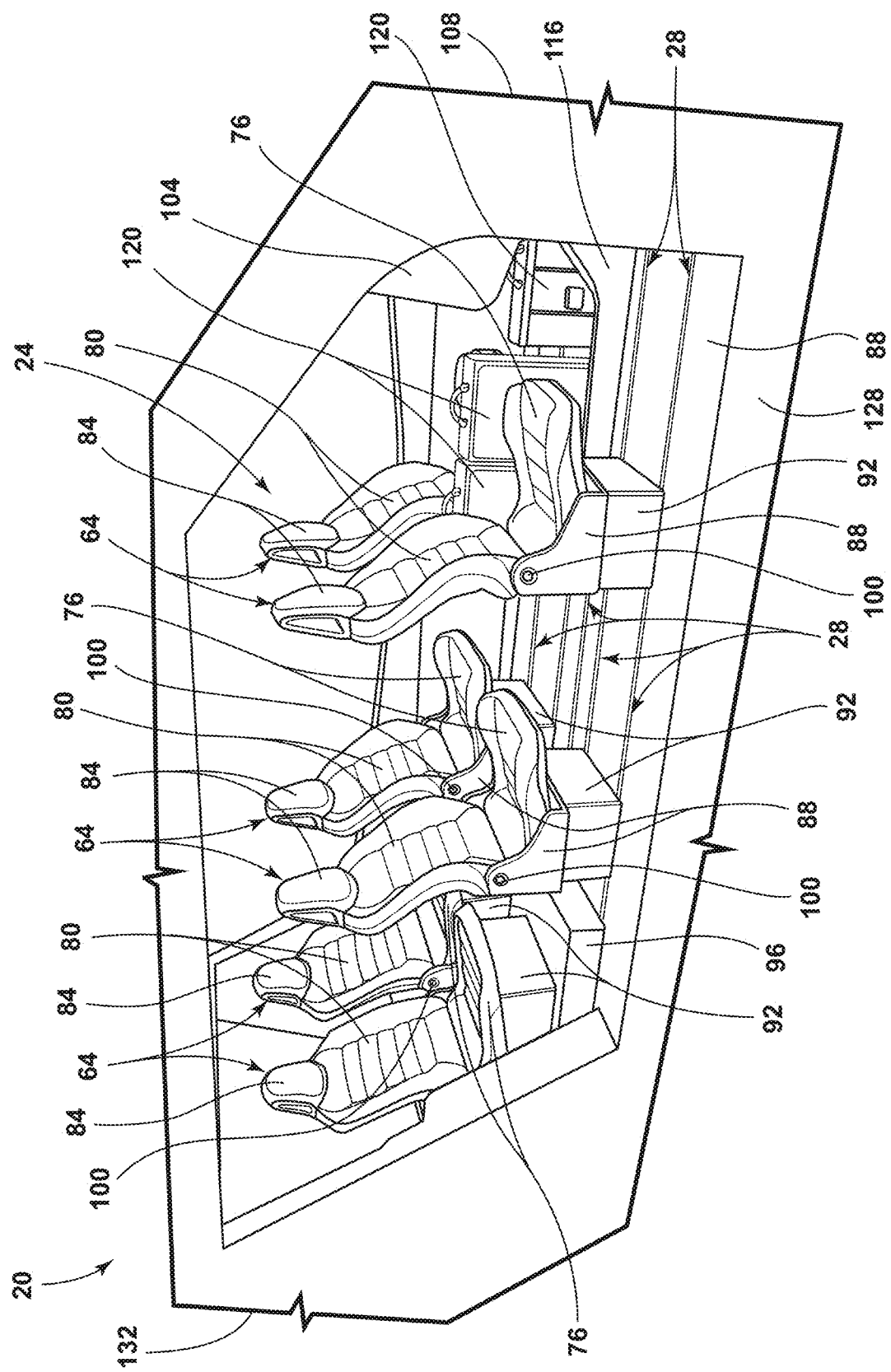
FIG. 1 is a side perspective view of a cabin of a vehicle, illustrating a configuration of seating assemblies, according to one example.
Figure 4:
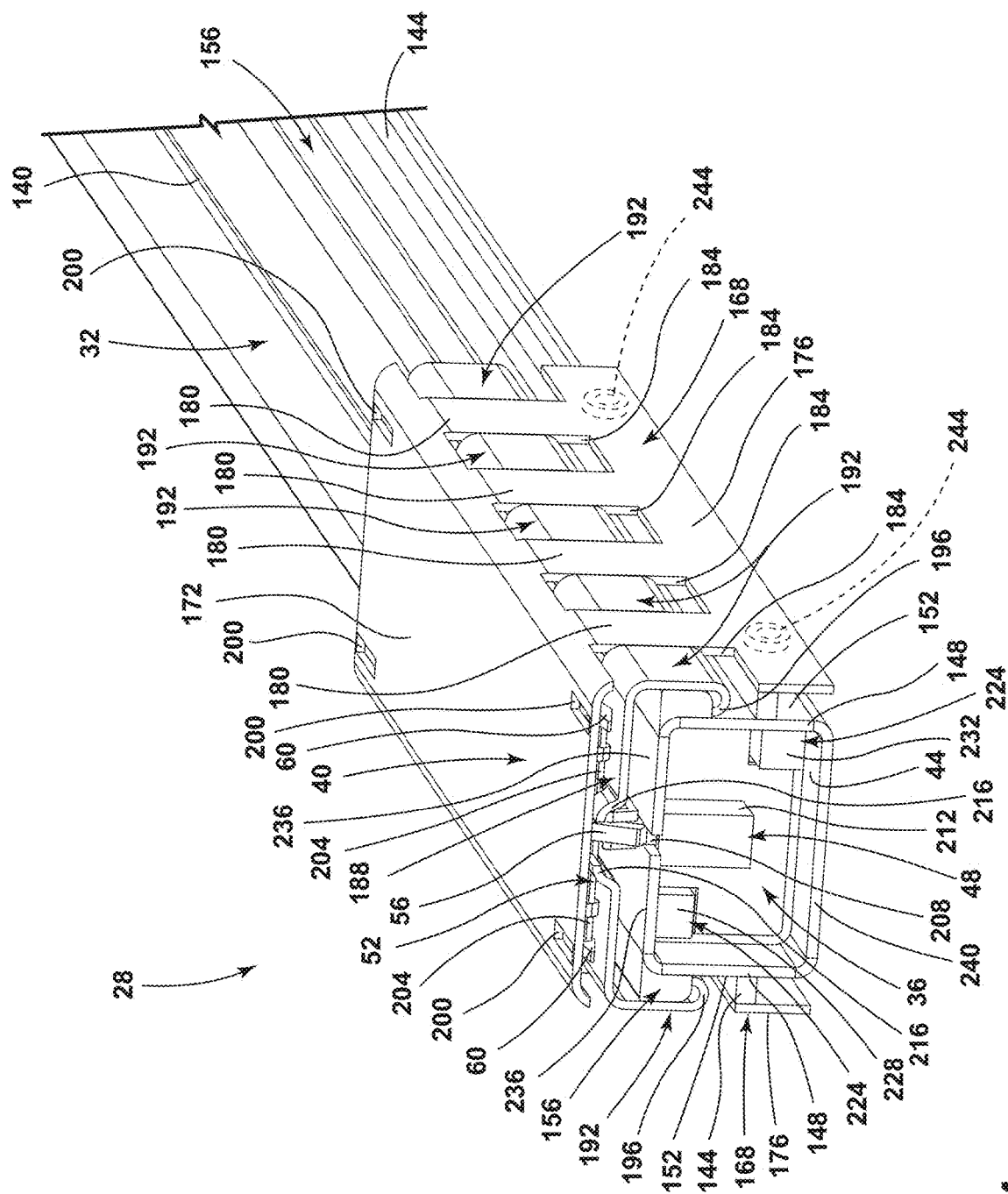
FIG. 4 is an expanded view, taken at region IV of FIG. 3, illustrating the track assembly, the carriage assembly, and the shuttle assembly engaged with one another, according to one example.

For purposes of description herein, the terms "upper," "lower," "right," "left," "rear," "front," "vertical," "horizontal," and derivatives thereof shall relate to the concepts as oriented in FIG. 1 or 4. However, it is to be understood that the concepts may assume various alternative orientations, except where expressly specified to the contrary. It is also to be understood that the specific devices and processes illustrated in the attached drawings, and described in the following specification are simply exemplary embodiments of the inventive concepts defined in the appended claims. Hence, specific dimensions and other physical characteristics relating to the embodiments disclosed herein are not to be considered as limiting, unless the claims expressly state otherwise.

The present illustrated embodiments reside primarily in combinations of method steps and apparatus components related to a rail assembly. Accordingly, the apparatus components and method steps have been represented, where appropriate, by conventional symbols in the drawings, showing only those specific details that are pertinent to understanding the embodiments of the present disclosure so as not to obscure the disclosure with details that will be readily apparent to those of ordinary skill in the art having the benefit of the description herein. Further, like numerals in the description and drawings represent like elements.

As used herein, the term "and/or," when used in a list of two or more items, means that any one of the listed items can be employed by itself, or any combination of two or more of the listed items, can be employed. For example, if a composition is described as containing components A, B, and/or C, the composition can contain A alone; B alone; C alone; A and B in combination; A and C in combination; B and C in combination; or A, B, and C in combination.

In this document, relational terms, such as first and second, top and bottom, and the like, are used solely to distinguish one entity or action from another entity or action, without necessarily requiring or implying any actual such relationship or order between such entities or actions. The terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus. An element proceeded by "comprises . . . a" does not, without more constraints, preclude the existence of additional identical elements in the process, method, article, or apparatus that comprises the element.

As used herein, the term "about" means that amounts, sizes, formulations, parameters, and other quantities and characteristics are not and need not be exact, but may be approximate and/or larger or smaller, as desired, reflecting tolerances, conversion factors, rounding off, measurement error and the like, and other factors known to those of skill in the art. When the term "about" is used in describing a value or an end-point of a range, the disclosure should be understood to include the specific value or end-point referred to. Whether or not a numerical value or end-point of a range in the specification recites "about," the numerical value or end-point of a range is intended to include two embodiments: one modified by "about," and one not modified by "about." It will be further understood that the end-points of each of the ranges are significant both in relation to the other end-point, and independently of the other end-point.

The terms "substantial," "substantially," and variations thereof as used herein are intended to note that a described feature is equal or approximately equal to a value or description. For example, a "substantially planar" surface is intended to denote a surface that is planar or approximately planar. Moreover, "substantially" is intended to denote that two values are equal or approximately equal. In some embodiments, "substantially" may denote values within about 10% of each other, such as within about 5% of each other, or within about 2% of each other.

As used herein the terms "the," "a," or "an," mean "at least one," and should not be limited to "only one" unless explicitly indicated to the contrary. Thus, for example, reference to "a component" includes embodiments having two or more such components unless the context clearly indicates otherwise.

Referring to FIGS. 1-11, a vehicle is generally designated by reference numeral 20. The vehicle 20 has a cabin 24 that is equipped with one or more rail assemblies 28. The rail assemblies 28 can each include a track assembly 32, a shuttle assembly 36, and a carriage assembly 40. The track assembly 32 defines an interior channel 44, The shuttle assembly 36 is received within the interior channel 44. The shuttle assembly 36 includes a lock assembly 48. The carriage assembly is coupled to the track assembly 32. The carriage assembly includes a trigger assembly 52. The trigger assembly 52 includes a trigger cam 56 and an actuator cam 60. The actuator cam 60 is coupled to the trigger cam 56. The actuator cam 60 actuates the carriage assembly 40 between locked (FIGS. 4-7B) and unlocked configurations (FIGS. 8A-9B) relative to the track assembly 32.

Referring again to FIGS. 1-2, the cabin 24 of the vehicle 20 can be provided with one or more rail-mounted components, such as seating assemblies 64, storage units 68, and/or storage compartments 72. The seating assemblies 64 can be positioned at various locations along the rail assemblies 28 within the cabin 24. The seating assemblies 64 are provided with a seat 76, a seatback 80, and/or a headrest 84. The seat 76 and the seatback 80 can be pivotably coupled to one another by way of a carrier 88. In some examples, the carrier 88 may be directly coupled to the rail assemblies 28 (e.g., by anchors). Alternatively, in various examples, the carrier 88 may be coupled to the rail assemblies 28 indirectly (e.g., by a base portion 92). In some examples, the seating assemblies 64 that are positioned at a rearward most location within the cabin 24 may be provided with an additional raised area 96 that is directly coupled to either the carrier 88 or the base portion 92. The raised area 96 can provide the rearward most seating assemblies 64 with additional vertical height relative to the remaining seating assemblies 64 to allow occupants of the rearward most seating assemblies 64 a better vantage point and more interesting view than if the seating assemblies 64 were all at about the same height. The raised area 96, in some examples, may couple a plurality of the seating assemblies 64 together. For example, the raised area 96 may provide a common riser or dais between two adjacent seating assemblies 64. The seating assemblies 64 can be positioned in a conventional first row, second row, and/or third row configuration as shown in FIG. 1. Alternatively, the seating assemblies 64 can be positioned in an unconventional manner. For example, one or more of the seating assemblies 64 may be placed in a stored position. When in the stored position, the seating assemblies 64 may be stored in a number of positions and/or locations. For example, the seating assemblies 64 may be forward-dumped such that the seatback 80 is generally horizontal and generally parallel with the seat 76 by pivoting the seatback 80 forward about a pivot point 100 of the carrier 88. When in the stored position, the seating assemblies 64 may be stored beneath a forward console 104 that is positioned proximate the front 108 of the vehicle 20. The seating assemblies 64 may be provided with a swivel functionality that allows the seating assemblies 64 to pivot about a vertical axis relative to the floor 112 of the vehicle 20. For example, the carrier 88 may be coupled to the floor 112 by a swivel assembly that permits pivotable motion of the seating assembly 64 about a vertical axis while maintaining engagement of the seating assembly 64 with the rail assembly 28. In some examples, where the base portion 92 is employed, the carrier 88 and the base portion 92 may be coupled to one another in a manner that permits the pivotable motion of the seating assembly 64 about the vertical axis while maintaining the engagement of the seating assembly 64 with the rail assembly(ies) 28. For example, the base portion 92 may remain coupled to the rail assembly(ies) 28 and rotationally stationary relative to the rail assembly(ies) 28 while the carrier 88 and the seating assembly 64 pivot or rotate about the vertical axis relative to the rail assembly(ies) 28. In examples where the raised area 96 is employed, the raised area 96 may remain coupled to the rail assembly(ies) 28 and rotationally stationary relative to the rail assembly(ies) 28 while the seating assembly 64, the carrier 88, and/or the base portion 92 are capable of pivoting or rotating about the vertical axis relative to the rail assembly(ies) 28. In various examples, a central console 116 may be provided in a location between at least some of the seating assemblies 64 that are laterally adjacent to one another. The central console 116 may generally extend along a longitudinal axis, or travel axis, of the vehicle 20. The central console 116 can be provided with a number of functionalities, such as storing of luggage 120, providing electrical connections for electrical devices, providing data connections for interaction with the vehicle 20, and/or other convenience and comfort functionalities. The configuration illustrated in FIG. 1 may be referred to as passenger arrangements or primarily passenger based where the vehicle is primarily being used to transport passengers and their accompanying cargo items. The configuration illustrated in FIG. 2 may be referred to as a cargo arrangement or primarily cargo based. In some cargo transport examples, such as that shown in FIG. 2, one or more of the seating assemblies 64 may remain available for occupants that are traveling with the cargo items (e.g., vehicle operators, vehicle monitors, security personnel, etc.). The configuration illustrated in FIGS. 1 and 2 are exemplary in nature and are not intended to limit the scope of the present disclosure.

Figure 2:
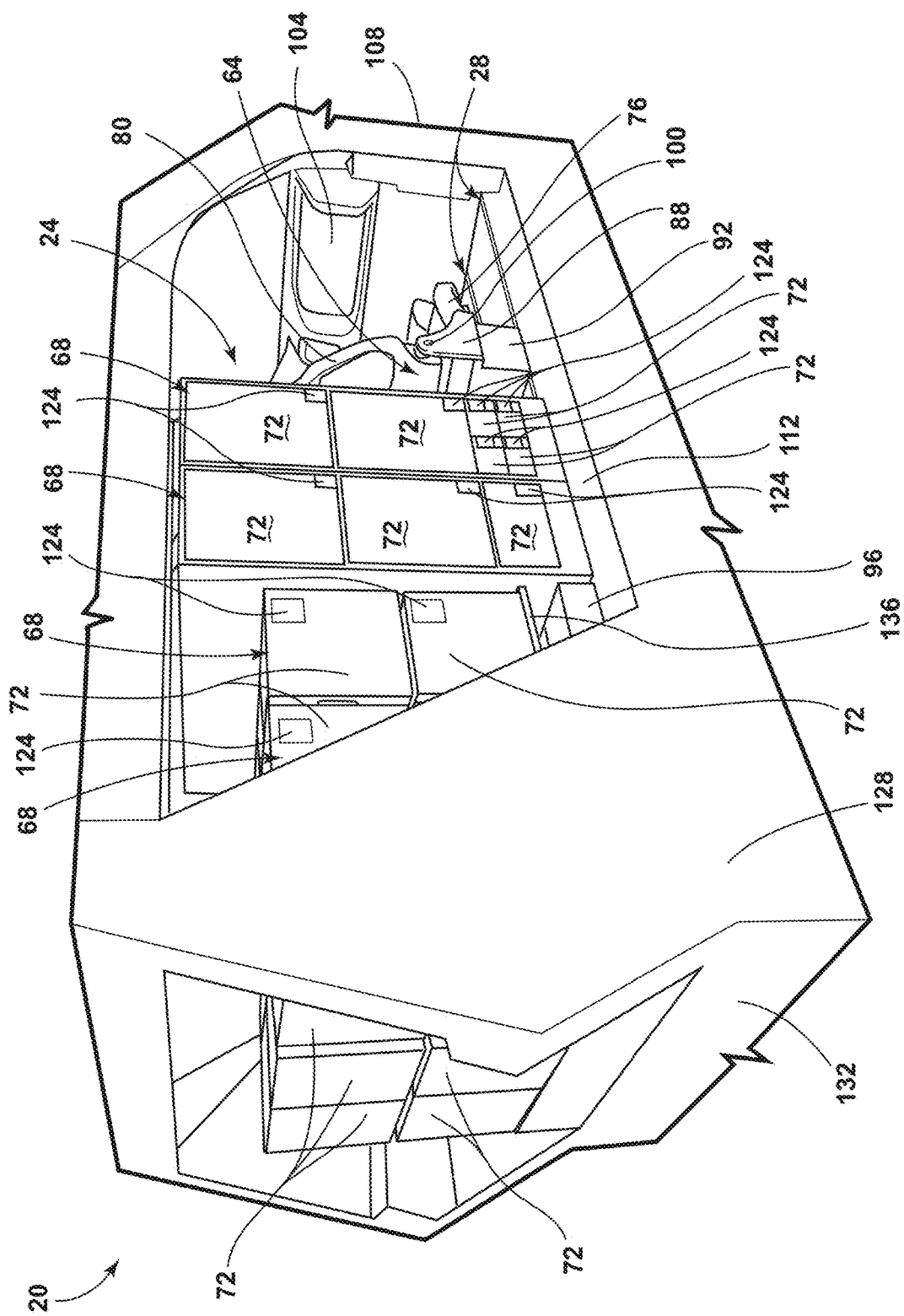
FIG. 2 is a rear perspective view of the cabin of the vehicle, illustrating a configuration of the seating assemblies and storage units, according to one example.

Referring further to FIGS. 1-2, in some cargo transport configurations unused seating assemblies 64 may be removed from the cabin 24 of the vehicle 20 to make room for cargo items to be stored within the cabin 24 while maintaining one or more of the seating assemblies 64 as available for occupants. The cargo items may be stored in storage units 68 that are placed within the cabin 24. The storage units 68 may engage with the rail assembly(ies) 28 such that the storage units 68 are prevented from unintentional motion during maneuvering of the vehicle 20. The storage units 68 may also receive power from the rail assembly 28 and/or communicate data between the storage units 68 and the vehicle 20 by way of one or more transceivers. The power and/or data communication provided to the storage units 68 may be used for temperature control of one or more storage compartments 72 within the storage units 68, for lighting the storage compartments 72, for locking/unlocking the storage compartments 72, for actuating a door of the storage compartments 72, for actuating the storage units 68 along the rail assembly 28, and/or for monitoring contents of the storage compartments 72 (e.g., sensors, imagers, etc.). The storage compartments 72 may be provided with latch assemblies 124 that can be actuated manually or automatically to provide access to an interior of the storage compartments 72. The storage compartments 72 can be accessed from one of the sides 128 or a rear 132 of the vehicle 20. Storage units 68 that are accessible from the rear 132 of the vehicle 20 may be positioned on a rear surface 136 of rearward most seating assemblies 64 when the rearward most seating assemblies 64 are placed in a stowed or fold-flat position. When storage units 68 are placed on the rear surfaces 136 of the rearward most seating assemblies 64, these storage units 68 may not be secured to the vehicle 20 by way of the rail assemblies 28. Alternatively, the storage units 68 that are placed on the rear surfaces 136 of the rearward most seating assemblies 64 may be secured to the vehicle 20 by interaction with various components of the cabin 24 of the vehicle 20. For example, the storage units 68 that are placed on the rear surfaces 136 of the rearward most seating assemblies 64 may be secured to the vehicle 20 by interacting with the storage units 68 that are secured to the rail assemblies 28, by tethering or anchoring to tie downs within a cargo area of the cabin 24, and/or by other suitable approaches.

Figure 3:
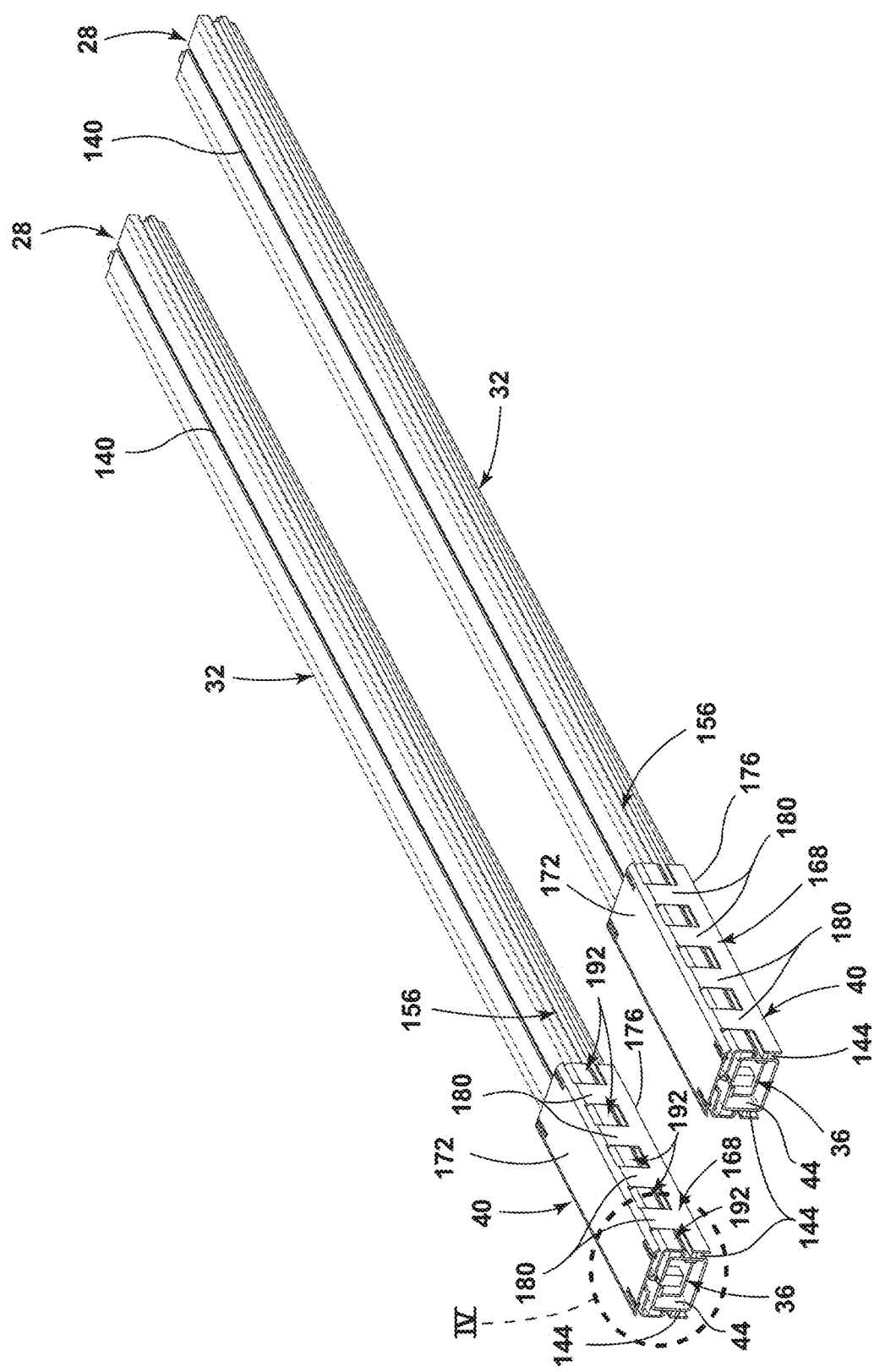
FIG. 3 is a side perspective view of a pair of rail assemblies, illustrating a track assembly, a carriage assembly, and a shuttle assembly, according to one example.
Figure 5:
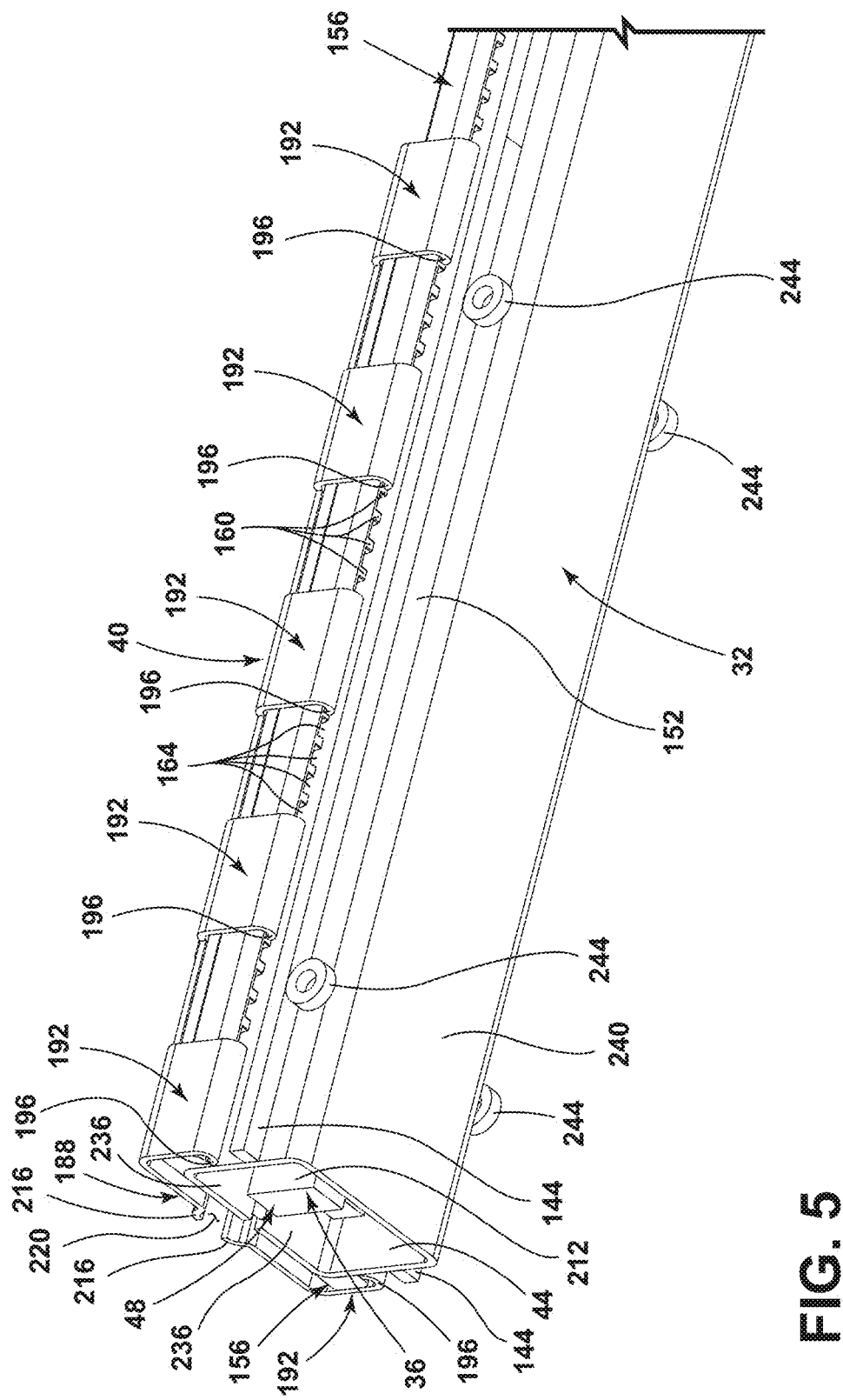
FIG. 5 is a bottom perspective view of the rail assembly, illustrating an engagement between lock arms of the carriage assembly and retention ribs of the track assembly, according to one example.
Figure 6:
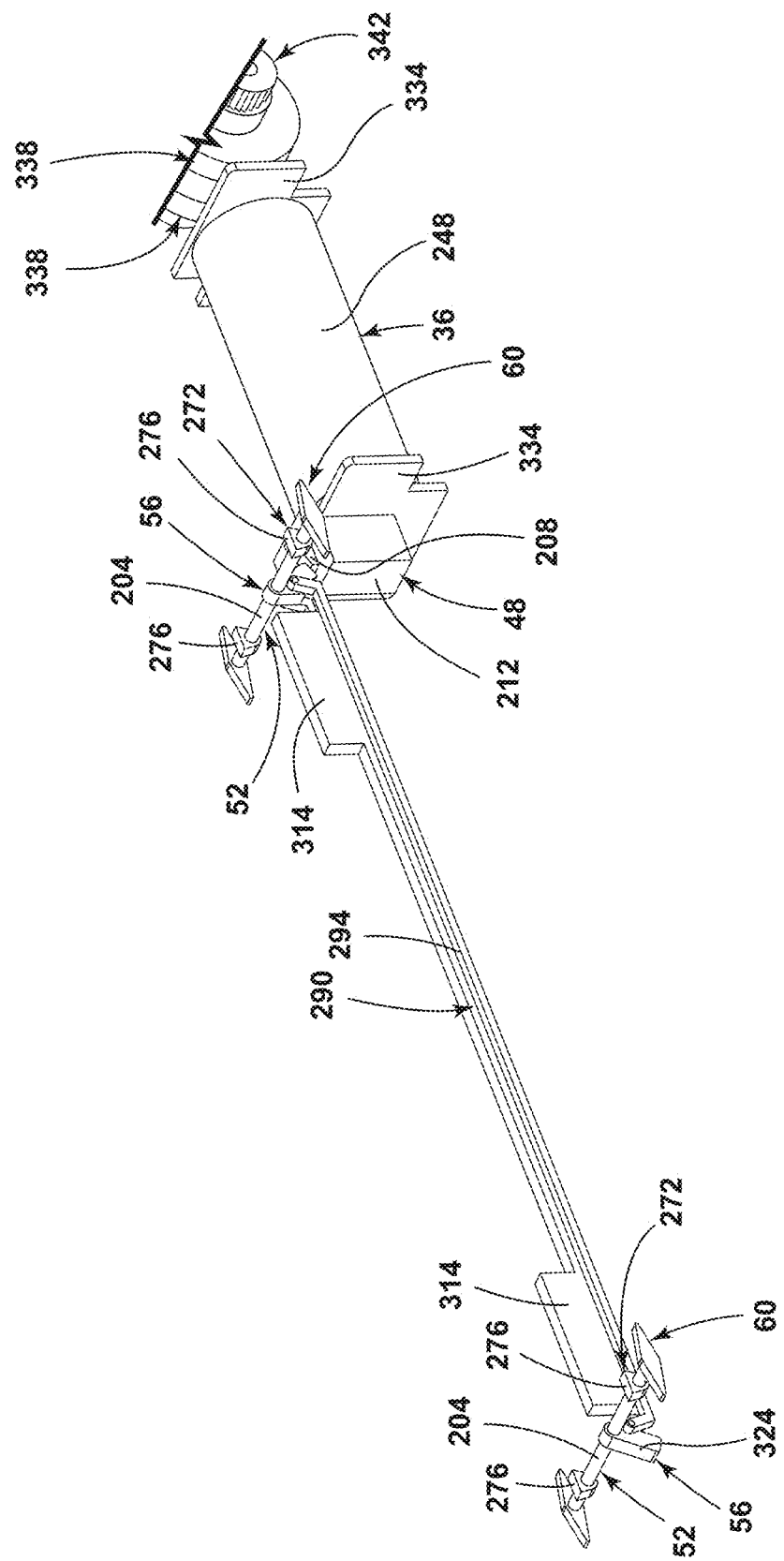
FIG. 6 is a side perspective view of isolated components of the carriage assembly with the shuttle assembly in close proximity, according to one example.
Figure 7A:
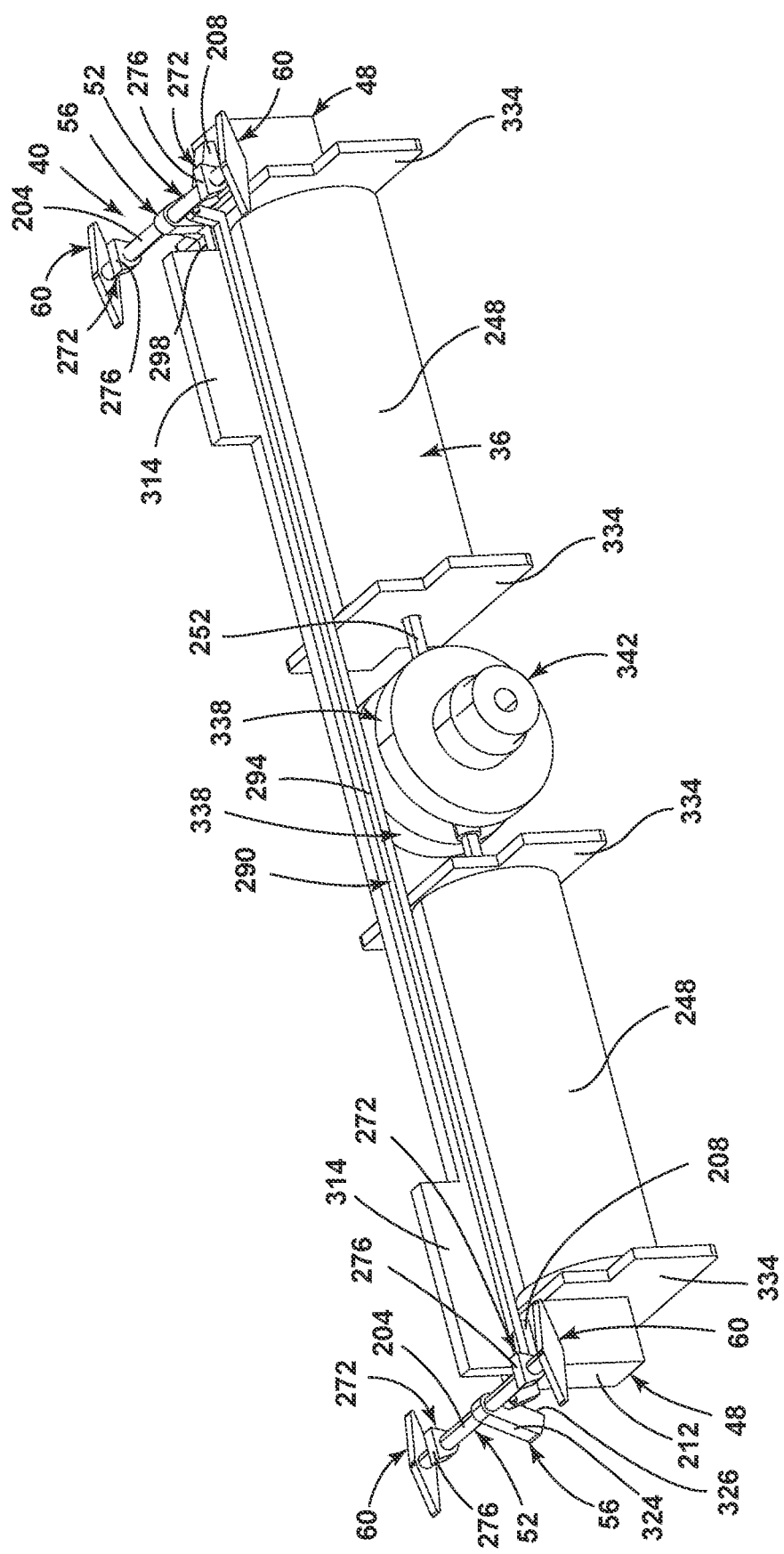
FIG. 7A is a side perspective view of the shuttle assembly actuated under the carriage assembly with the carriage assembly in the locked configuration, according to one example.
Figure 7B:
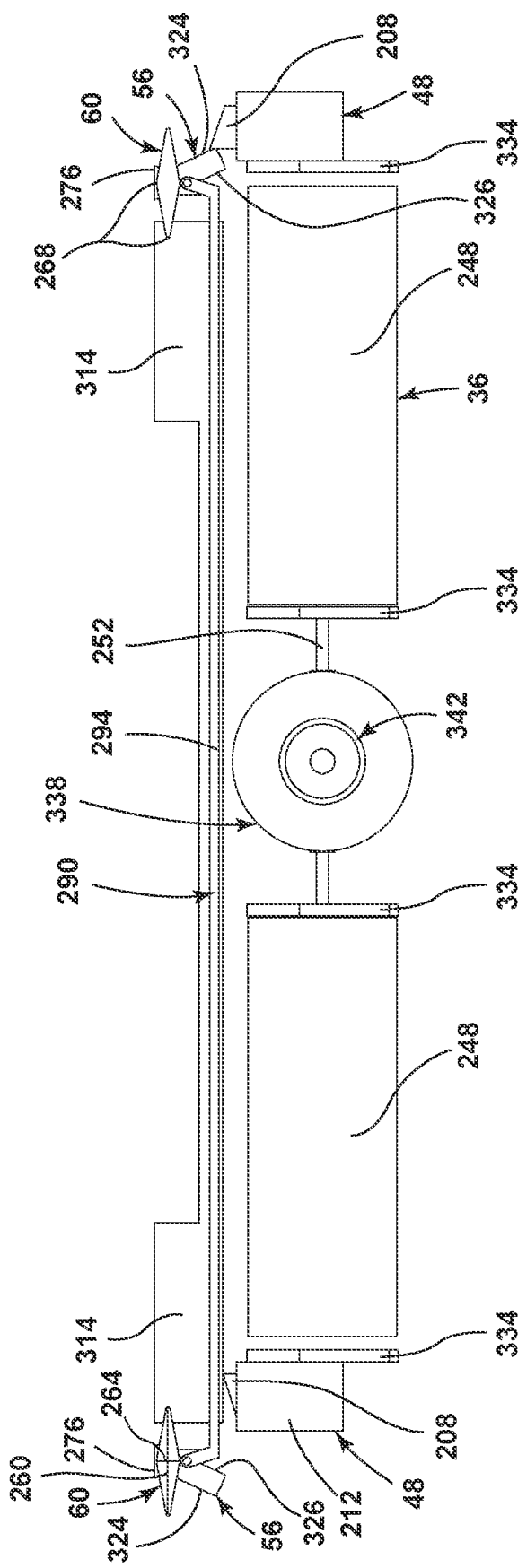
FIG. 7B is a side view of the shuttle assembly actuated under the carriage assembly with the carriage assembly in the locked configuration, according to one example.
Figure 8A:
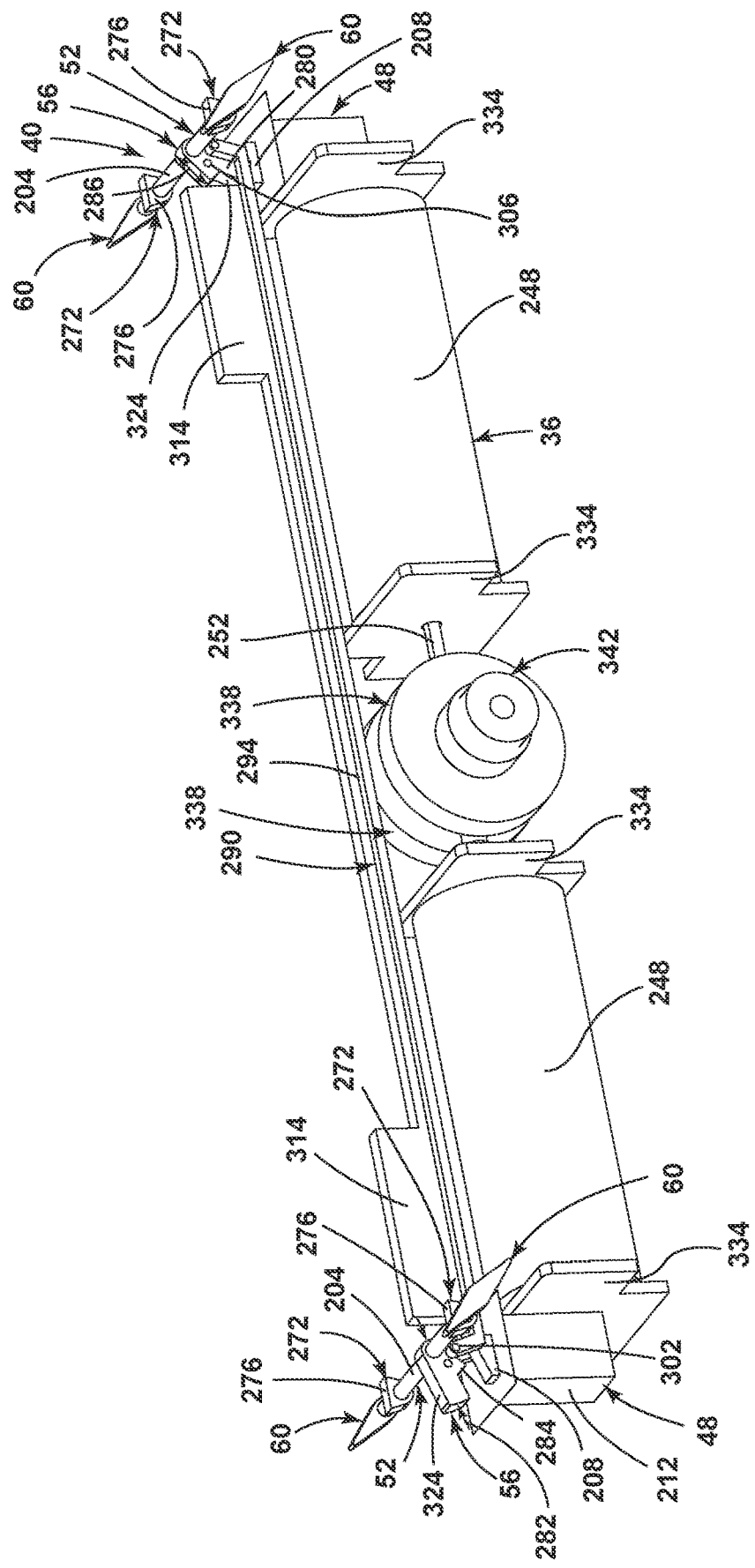
FIG. 8A is a side perspective view of the lock assembly interacting with the trigger assembly to place the carriage assembly in an unlocked configuration from a first direction, according to one example.
Figure 8B:
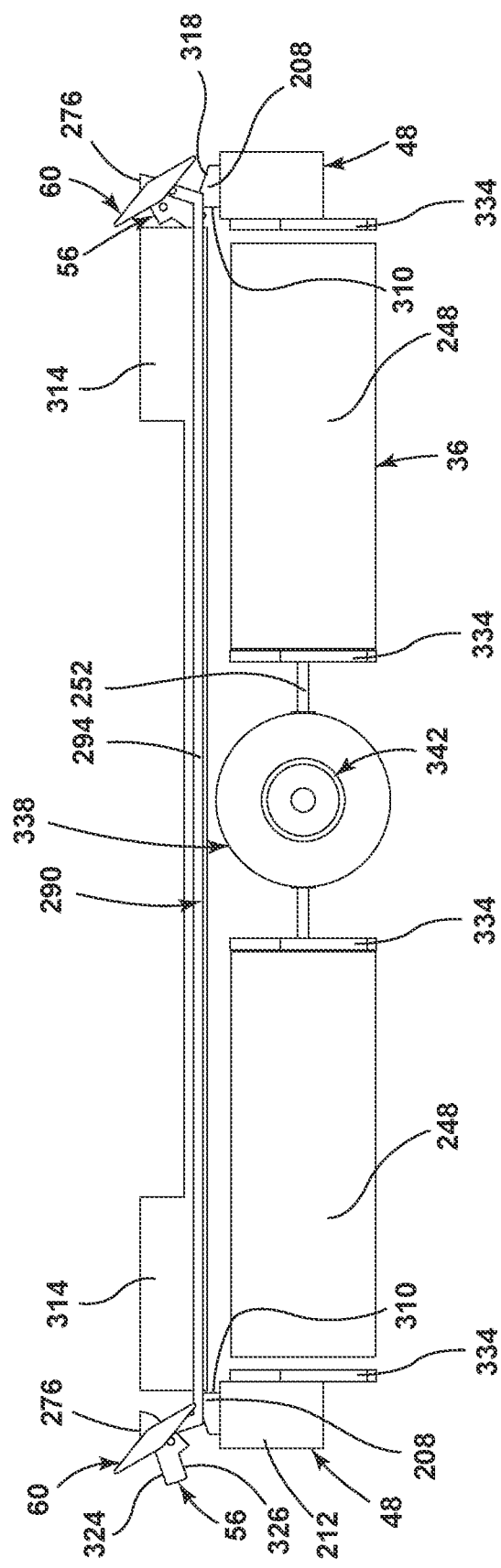
FIG. 8B is a side view of the lock assembly interacting with the trigger assembly to place the carriage assembly in the unlocked configuration from the first direction, according to one example.
Figure 9A:
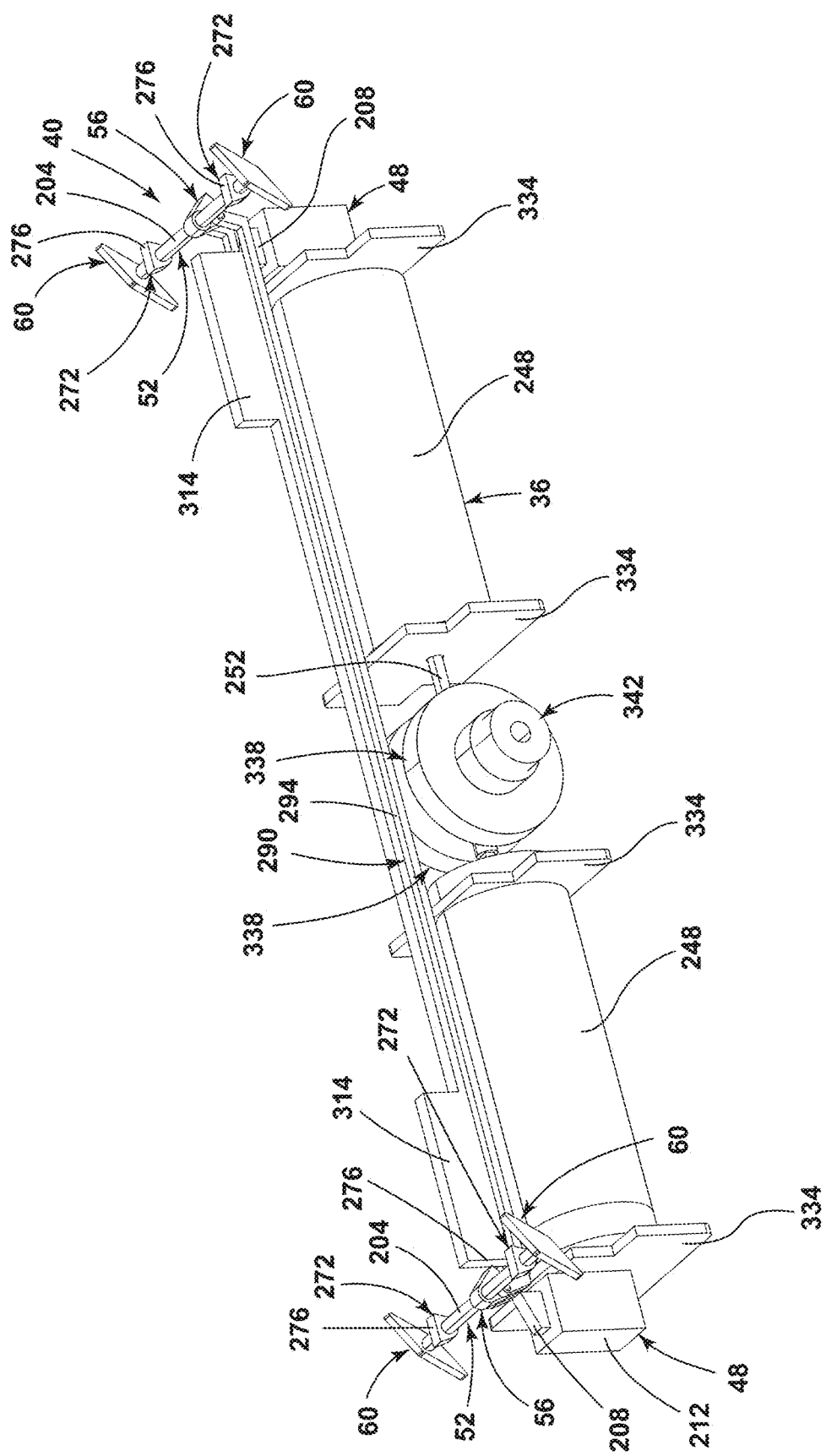
FIG. 9A is a side perspective view of the lock assembly interacting with the trigger assembly to place the carriage assembly in the unlocked configuration from a second direction, according to one example.
Figure 9B:
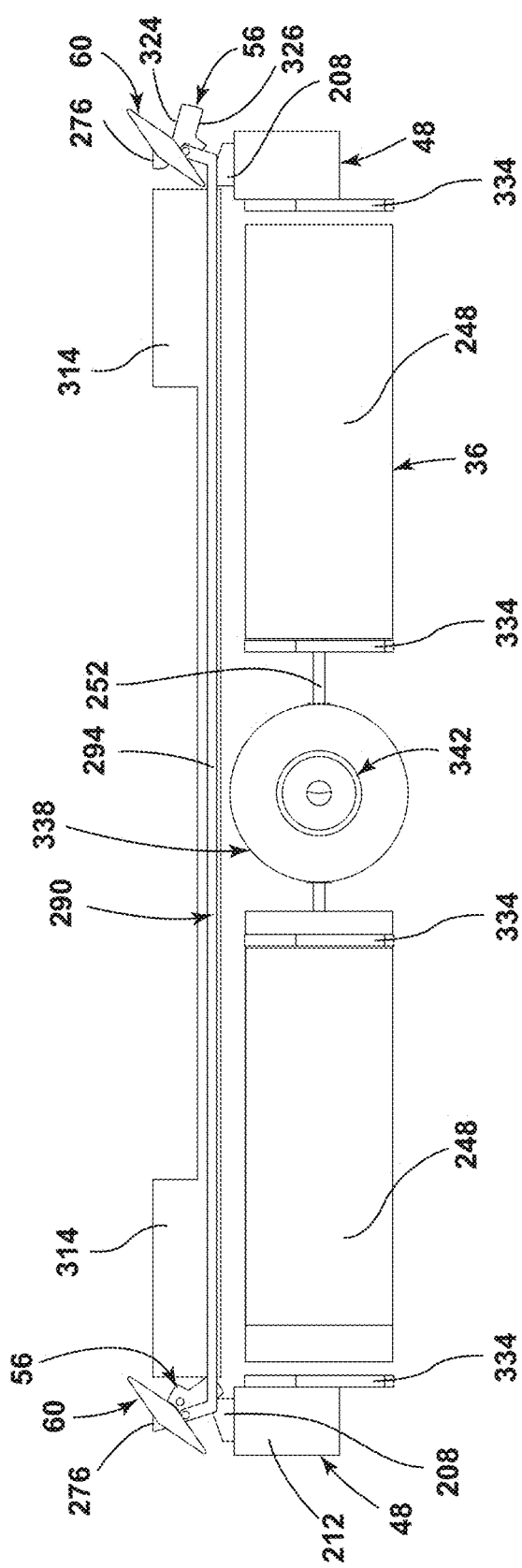
FIG. 9B is a side view of the lock assembly interacting with the trigger assembly to place the carriage assembly in the unlocked configuration from the second direction, according to one example.

Referring now to FIGS. 3-5, the rail assemblies 28 may be arranged in pairs such that the rail mounted components (e.g., seating assembly 64, storage unit 68, and/or storage compartment 72) may be coupled to adjacent rail assemblies 28 that make up the pair of rail assemblies 28. In various examples, the track assembly 32 can define a slot 140 in an upper surface thereof. In some examples, the track assembly 32 includes a guide protrusion 144. The guide protrusion 144 may extend from one or more sides of the track assembly 32. For example, the guide protrusions 144 can extend from each of two lateral sides 148 of the track assembly 32. The guide protrusions 144 can extend from an exterior surface 152 of the lateral sides 148 of the track assembly 32. The track assembly 32 can include a retention lip 156. An underside of the retention lip 156 can be provided with retention ribs 160 that are spaced apart from one another to define recesses 164 there between.

Referring again to FIGS. 3-5, the carriage assembly 40 can include a support bracket 168 that extends to engage with the guide protrusion 144 of the track assembly 32. In various examples, the support bracket 168 includes a support plate 172, a guide plate 176, and support arms 180. In such examples, the support arms 180 extend between the support plate 172 and the guide plate 176. The support arms 180 define apertures 184 between adjacent support arms 180. The carriage assembly 40 can include a lock plate 188 that extends to engage with the retention lip 156 of the track assembly 32. The lock plate 188 includes lock arms 192 that are positioned within the apertures 184 defined by the support arms 180. The lock arms 192 engage with the retention lip 156 to retain the carriage assembly 40 in a given position along the track assembly 32. For example, the lock arms 192 can include arcuate ends 196 that engage with an underside of the retention lip 156. The arcuate ends 196 of the lock arms 192 can be received within the recesses 164 that are defined by the retention ribs 160 of the retention lip 156. Accordingly, the arcuate ends 196 of the lock arms 192 can be provided with corresponding structures or protrusions that are spaced and sized to engage with the recesses 164 or generally correspond with the recesses 164 such that when the arcuate ends 196 are actively engaged with the recesses 164, the carriage assembly 40 is prevented from actuation along a length of the track assembly 32 by a physical impedance created by the interaction between the arcuate ends 196 and the retention ribs 160. When the arcuate ends 196 are disengaged from the retention ribs 160, the arcuate ends 196 are actuated a distance sufficient to clear the retention ribs 160. For example, the distance that the arcuate ends 196 are actuated can be 1 mm, 2 mm, 3 mm, 4 mm, 5 mm, 6 mm, 7 mm, 8 mm, 9 mm, 10 mm, 11 mm, 12 mm, 13 mm, 14 mm, 15 mm, and/or combinations or ranges thereof. It is contemplated that the distance that the arcuate ends 196 are actuated can be slightly greater than a cross-sectional overlap between the retention ribs 160 and the structures provided on the arcuate ends 196 to ensure the structures provided on the arcuate ends 196 are fully disengaged from the retention ribs 160. For example, the distance that the arcuate ends 196 are actuated may be 1 mm greater, 2 mm greater, 3 mm greater, 4 mm greater, 5 mm greater, 6 mm greater, 7 mm greater, 8 mm greater, 9 mm greater, and/or 10 mm greater than the cross-sectional overlap between the retention ribs 160 and the structures provided on the arcuate ends 196.

Referring further to FIGS. 3-5, the support plate 172 of the support bracket 168 can define one or more apertures 200 that are positioned over the actuator cams 60 of the trigger assembly 52. In examples, the apertures 200 in the support plate 172 can receive at least a portion of the actuator cams 60 that are positioned therebelow when the actuator cams 60 are rotated about an axis defined by a cam rod 204 of the trigger assembly 52. The actuator cams 60 may be oblong in shape, such that the actuator cams 60 are defined by a major axis and a minor axis, as will be discussed in further detail below. Accordingly, when the actuator cams 60 are rotated about the axis defined by the cam rod 204, the dimension of the actuator cam 60 that defines the major axis may extend upwardly, at least in part, into the apertures 200 defined by the support plate 172. Such a rotation of the actuator cams 60 can actuate the lock plate 188 on the carriage assembly 40 in a downward direction such that the arcuate ends 196 of the lock arms 192 are disengaged from the retention ribs 160 of the retention lip 156, thereby placing the carriage assembly 40 in an unlocked position or configuration. When the carriage assembly 40 is placed in an unlocked configuration relative to the track assembly 32, the carriage assembly 40 may be actuated along a length direction of the track assembly 32. Rotation of the actuator cams 60 about the axis defined by the cam rod 204 can be initiated or affected by a plunger 208 of the lock assembly 48. For example, the plunger 208 may be extendable from a body 212 of the lock assembly 48. Accordingly, the plunger 208 may be operable between extended and retracted positions relative to the body 212 of the lock assembly 48. In various examples, the plunger 208 can be biased toward the extended position and the lock assembly 48 may be provided with the ability to actuate the plunger 208 to the retracted position. For example, the lock assembly 48 may be a solenoid that biases the plunger 208 to the extend position and upon energizing or powering the solenoid, the plunger 208 may be moved from the extend position to the retracted position or to an at least partially retracted position. The extended position of the plunger 208 can cause rotation of the trigger cam 56 about an axis defined by the cam rod 204. The cam rod 204 may operably couple the trigger cam 56 with the actuator cam 60 such that rotational motion of the trigger cam 56 induces rotational motion of the actuator cam 60. As will be discussed in more detail below, the lock assembly 48 may therefore interact with the trigger assembly 52 to actuate the carriage assembly 40 between locked and unlocked positions or configurations relative to the track assembly 32.

Referring still further to FIGS. 3-5, the lock plate 188 can define raised regions 216 that are positioned on either side of the slot 140 of the track assembly 32. The raised regions 216 may be spaced apart from one another such that the raised regions 216 define a channel 220, therebetween. The channel 220 defined by the raised regions 216 can provide clearance for the components of the trigger assembly 52 such that the trigger assembly 52 can extend from an upper side of the lock plate 188 to an underside of the lock plate 188. Accordingly, the trigger assembly 52 may be more easily engaged by the lock assembly 48, without introducing potential snagging, catching, or other physical impedance of the lock assembly's 48 ability to be actuated along the track assembly 32 and ultimately engaged with the carriage assembly 40. More specifically, the channel 220 defined by the raised regions 216 can prevent binding or sticking of components of the shuttle assembly 36 as the shuttle assembly 36 is actuated along the track assembly 32 to selectively engage and/or disengage with one or more carriage assemblies 40 that are coupled to the track assembly 32. The track assembly 32 can be provided with one or more drive racks 224. For example, the track assembly 32 can be provided with a first drive rack 228 and a second drive rack 232. Regardless of the number of drive racks 224 that are provided in the track assembly 32, the drive racks 224 can be engaged by one or more components of the shuttle assembly 36 to affect actuation of the shuttle assembly 36 along the track assembly 32. For example, as shown in the depicted example, the track assembly is provided with the first drive rack 228 in an upper corner of the interior channel 44 of the track assembly 32 and the second drive rack 232 is provided in a lower corner of the interior channel 44 of the track assembly 32. Said another way, the first drive rack 228 can be coupled to an underside of a top wall 236 of the track assembly 32 and to an interior side of one of the lateral sides 148 of the track assembly 32. Similarly, the second drive rack 232 can be coupled to an interior side of one of the lateral sides 148 of the track assembly 32 and to an upper surface of a bottom wall 240 of the track assembly 32. In various examples, the first and second drive racks 228, 232 can be diagonally position relative to one another (e.g., cater-cornered to one another). In the depicted example, two of the four corners of the first and second drive racks 228, 232 are therefore coupled to the track assembly 32 within the interior channel 44, while the remaining two of four sides of the first and second drive racks 228, 232 are free of direct engagement with the track assembly 32. Accordingly, at least one of the free sides of each of the first and second drive racks 228, 232 can be provided with a series of drive teeth that can be engaged by the shuttle assembly 36 such that the shuttle assembly 36 can be actuated along a length of the track assembly 32. For example, the shuttle assembly 36 can be provided with one or more rotatable members that engage with the drive teeth of the first drive rack 228 and/or the drive teeth of the second drive rack 232 such that rotation of the rotational members of the shuttle assembly 36 can be transmitted into linear actuation or translation of the shuttle assembly 36 along the track assembly 32, as will be discussed further herein. For example, the rotational members may be provided with gear teeth that engage with the drive teeth of the first drive rack 228 and/or the second drive rack 232. In such an example, the engagement between the gear teeth and the drive teeth can provide a constant lock of the shuttle assembly 36 relative to the track assembly 32 when the rotational members are not being actuated to affect translation of the shuttle assembly 36. Said another way, the shuttle assembly 36 may prevent rotation of the rotational members when actuation of the shuttle assembly 36 is not intended to be initiated, thereby providing a physical impedance or stop by the interaction between the gear teeth on the rotational members and the drive teeth on the drive racks 224.

Referring yet again to FIGS. 3-5, the carriage assembly 40 can include guide rollers 244 that engage with an underside of the guide protrusion 144 of the track assembly 32. The guide rollers 244 can aid in retention of the carriage assembly 40 to the track assembly 32 while also decreasing a coefficient of friction between the track assembly 32 and the carriage assembly 40 when the carriage assembly 40 is actuated along the track assembly 32. Specifically, the guide rollers 244 can decrease the coefficient of friction associated with actuating the carriage assembly 40 along the track assembly 32 by adjusting at least some of the friction associated with actuation of the carriage assembly 40 from sliding friction to rolling friction. The guide rollers 244 can therefore assist in actuation of the carriage assembly 40 along the track assembly 32 in a first direction (e.g., a horizontal direction) while providing at least some retention in a second direction (e.g., a vertical direction) and the second direction can be angularly offset from the first direction (e.g., the second direction and the first direction may be perpendicular to one another). The guide rollers 244 may be coupled to an interior surface of the support bracket 168 of the carriage assembly 40. More specifically, the guide rollers 244 may be coupled to an interior surface of the guide plate 176, such that the guide rollers 244 are positioned between the guide plate 176 and an exterior surface of the lateral side 148 of the track assembly 32. The guide rollers 244 can be coupled to the guide plate 176 in a manner that permits rotation of the guide rollers 244 relative to the guide plate 176. The guide rollers 244 can engage with an underside of the guide protrusion 144 of the track assembly 32. In some examples, the guide rollers 244 may be replaced with guide bars that are made of a material that has a low coefficient of friction with the material from which the track assembly 32 and/or the guide protrusion 144 are made. For example, the track assembly 32 and/or the guide protrusion 144 may be constructed from a metallic material (e.g., steel) and the guide bars that replace the guide rollers 244 may be made of a polymer (e.g., high density polyethylene) that has a low coefficient of friction with the metallic material from which the track assembly 32 and/or the guide protrusion 144 are made.

Referring now to FIGS. 6-9B, the shuttle assembly 36 is shown with components of the trigger assembly 52 of the carriage assembly 40. The shuttle assembly 36 can include one or more motors 248. The motors 248 may each include a driveshaft 252 that extends from the motor 248. A first end of each of the driveshafts 252 may be coupled to the motor 248 while a second end, which is opposite the first end, may be coupled to a pinion gear 256 (see FIG. 11). As described above, the trigger assembly 52 includes the trigger cam 56 and the actuator cam 60. The trigger cam 56 and the actuator cam 60 can be coupled to one another by the cam rod 204. For example, the trigger cam 56 and the actuator cam 60 may each be fixedly coupled to the cam rod 204. Accordingly, rotational motion that is imparted to the trigger cam 56 can be translated into rotational motion of the actuator cam 60 by way of the coupling to the cam rod 204. The rotational motion imparted to the trigger cam 56 and ultimately translated into rotational motion of the actuator cam 60 can be imparted or initiated by the lock assembly 48. For example, the plunger 208 of the lock assembly 48 can be extended from the body 212 of the lock assembly 48 to engage with the trigger cam 56 in a manner that induces rotational motion of the trigger cam 56 about a rotational axis defined by the cam rod 204. The rotational motion that is imparted to the trigger cam 56 by the plunger 208 can therefore induce rotational motion of the cam rod 204 and ultimately the actuator cam 60. The rotation of the actuator cam 60 can effect linear motion of the lock arms 192 of the lock plate 188 relative to the track assembly 32 such that the arcuate ends 196 of the lock arms 192 are disengaged from the retention lip 156 of the track assembly 32. Accordingly, rotational motion of the actuator cam 60 can transition the carriage assembly 40 between locked and unlocked positions or configurations relative to the track assembly 32 such that the shuttle assembly 36 may actuate the carriage assembly 40 along a length of the track assembly 32.

Referring again to FIGS. 6-9B, the actuation of the lock arms 192 by the actuator cam 60 can be enabled by the actuator cam 60 being provided with an elongate shape. For example, the actuator cam 60 may be oblong in shape, diamond-shaped, and/or oval-shaped. Accordingly, the actuator cam 60 can include or be defined by a major axis 260 and a minor axis 264. The major axis 260 has a length that is greater than a length of the minor axis 264. In various examples, the major axis 260 and the minor axis 264 may be perpendicular to one another, however, the present disclosure is not so limited. Rather, the major axis 260 and the minor axis 264 may be oriented relative to one another such that the major axis 260 and the minor axis 264 are offset from one another by an angular displacement of greater than zero degrees (0°) and less than one-hundred-eighty degrees (180°). The sides of the actuator cam 60 that define the major axis 260 and the minor axis 264 can include flat or rounded apexes 268. When the apexes 268 of the major and minor axes 260, 264 are provided as rounded, flat, or otherwise contoured, the actuator cam 60 may be more easily transitioned between the positions that correspond with the locked configuration of the carriage assembly 40 (FIGS. 7A-7B) and the unlocked configuration of the carriage assembly 40 (FIGS. 8A-9B). In various examples, the minor axis 264 of the actuator cam 60 can correspond to the locked configuration of the carriage assembly 40.

Referring further to FIGS. 6-9B, in some examples, the trigger assembly 52 can include one or more bearing members 272 that are positioned between the support bracket 168 and the lock plate 188. For example, the bearing members 272 may be positioned between the support plate 172 of the support bracket 168 and a planar portion of the lock plate 188 that is positioned between the raised regions 216 and the lock arms 192 of the lock plate 188. In some examples, the bearing members 272 may be provided with bearing surfaces 276 that are generally planar and parallel to the support plate 172. The bearing members 272 can be coupled to the cam rod 204 in a manner that permits rotation of the cam rod 204 within apertures of the bearing members 272, through which the cam rod 204 extends. That is, the bearing members 272 may not rotate with the cam rod 204 when the actuator cams 60 are rotated. Rather, the bearing members 272 may remain in substantially the same rotational position, regardless of a rotational position of the cam rod 204. Maintenance of the rotational position of the bearing members 272 relative to the cam rod 204 can be aided by the bearing surfaces 276 interacting with an underside of the support plate 172 such that the bearing members 272 are limited in their rotational freedom. It is contemplated that some rotational displacement of the bearing members 272 may occur upon rotation of the cam rod 204 and such rotational displacement of the bearing members 272 may be limited by a space between the bearing surfaces 276 and an underside of the support plate 172.

Referring still further to FIGS. 6-9B, the trigger cam 56 can include a first leg 280 and a second leg 284. The first leg 280 of the trigger cam 56 can have a length 282 that is greater than a length 286 of the second leg 284. A transition between the first leg 280 and the second leg 284 may resemble a step-like difference in the length 282 of the first leg 280 and the length 286 of the second leg 284. The trigger cam 56 at a first end of the trigger assembly 52 (e.g., the trigger cam 56 at the left of FIGS. 6 and 7A) may be coupled to the trigger cam 56 at a second end of the trigger assembly 52 (e.g., the trigger cam 56 at the right of FIGS. 6 and 7A) by a linkage assembly 290. The linkage assembly 290 can include a first bar 294 and a second bar 298 that are each coupled to the trigger cams 56 of the trigger assembly 52. In the depicted example, the first and second bars 294, 298 of the linkage assembly 290 are positioned on either lateral side of each of the trigger cams 56 positioned at the first and second ends of the trigger assembly 52. Said another way, the first and second bars 294, 298 of the linkage assembly 290 can bracket the trigger cams 56. The first and second bars 294, 298 of the linkage assembly 290 may be coupled to each of the trigger cams 56 by retention pins 302. The retention pins 302 of the linkage assembly 290 can be inserted into apertures 306 defined by the first bar 294, the second bar 298, and/or the trigger cam 56. The coupling between the first and second bars 294, 298 and the trigger cams 56 can permit rotational motion of the trigger cams 56 relative to the first and second bars 294, 298. In some examples, the coupling of the trigger cams 56 by the first and second bars 294, 298 can transmit and/or synchronize rotational motion of one of the trigger cams 56 with rotational motion of the other of the trigger cams 56. Said another way, the trigger assembly 52 may be provided with first and second trigger cams 56 that are positioned at the first and second ends of the trigger assembly 52, respectively. The coupling of the first and second trigger cams 56 by the first and second bars 294, 298 of the linkage assembly 290 can enable rotational motion imparted to the first trigger cam 56 to be transmitted to the second trigger cam 56 and vice versa. Additionally or alternatively, rotational motion of the first and second trigger cams 56 may be synchronized by way of the coupling of the first and second trigger cams 56 by the first and second bars 294, 298.

Referring yet again to FIGS. 6-9B, in various examples, rotational motion of the trigger cam 56 can be imparted by the lock assembly 48. In addition to initiating rotation of the trigger earns 56, the extended position of the plunger 208 relative to the body 212 of the lock assembly 48 can catch or otherwise couple the shuttle assembly 36 to the carriage assembly 40 such that actuation of the carriage assembly 40 by the shuttle assembly 36 along the track assembly 32 can be achieved. For example, an inward surface 310 of the plunger 208 can be positioned proximate to a portion of the carriage assembly 40 (e.g., guide tab 314) such that at least a portion of the carriage assembly 40 is physically constrained between the inward surfaces 310 of the plungers 208 of the lock assemblies 48 when the shuttle assembly 36 is engaged with the carriage assembly 40. Additionally, at least one of the trigger cams 56 is pinned or otherwise constrained between the inward surface 310 of one of the plungers 208 and an adjacent surface of the guide tab 314, as will be discussed in further detail below. Accordingly, due to the coupling between the shuttle assembly 36 and the carriage assembly 40, actuation of the shuttle assembly 36 results in actuation of the carriage assembly 40 when the plungers 208 are in the extended position as the extended position of the plungers 208 disengages the carriage assembly 40 from the locked configuration and places the carriage assembly 40 in the unlocked configuration relative to the track assembly 32. Additionally, the extended position of the plungers 208 physically constrain at least a portion of the carriage assembly 40 such that actuation of the shuttle assembly 36 is translated into actuation of the carriage assembly 40 along the track assembly 32. In various examples, the plunger 208 can be provided with an upper surface 318 that is sloped. For example, the upper surface 318 of the plunger 208 may be sloped in a downward direction extending from the inward surface 310 of the plunger 208 to an outward surface 322 of the plunger 208.

Referring further to FIGS. 6-9B, the upper surface 318 of the plunger 208 being provided as a sloped surface can aid in actuation of the shuttle assembly 36 underneath a locked carriage assembly 40 without the extended plunger 208 unintentionally placing the carriage assembly 40 in the unlocked configuration or position. In some examples, contact between the plunger 208 and the first leg 280 may initiate rotational motion of the trigger cam 56 in one of a clockwise and a counter-clockwise direction about the rotational axis that is defined by the cam rod 204. For example, with the plunger 208 in the extended position, contact between the inward surface 310 of the plunger 208 and an outward surface 324 of the first leg 280 of the trigger cam 56 can initiate rotational motion of the trigger cam 56 in one of the clockwise and the counter-clockwise direction about the rotational axis that is defined by the cam rod 204, depending upon the direction of actuation of the shuttle assembly 36 relative to the carriage assembly 40. In instances where the trigger cam 56 is rotated in the clockwise direction (see FIGS. 8A-8B) about the rotational axis that is defined by the cam rod 204, the shuttle assembly 36 is actuated from right-to-left from a region of the track assembly 32 that is not immediately below the carriage assembly 40 with the plungers 208 biased toward the extended position. With the plungers 208 in the extended position and the shuttle assembly 36 actuating from right-to-left in FIGS. 7A-8B, as the shuttle assembly 36 approaches a locked carriage assembly 40 the angled upper surface 318 of the leading plunger 208 (i.e., the plunger 208 on the left) engages with the trigger cam 56, which can actuate the plunger 208 toward the retracted position. Alternatively, the lock assembly 48 can be provided with power or otherwise energized to retract the leading plunger 208 toward the retracted position. As the shuttle assembly 36 continues to actuate underneath the locked carriage assembly 40, the leading plunger 208 may remain in an at least partially retracted position by way of interaction with an underside of the guide tab 314 of the associated carriage assembly 40 or as a result of the lock assembly 48 being powered or otherwise energized to move the plunger 208 toward the retracted position. The guide tab 314 extends from the carriage assembly 40 into the slot 140 in the track assembly 32 can aid in aligning and/or guiding the carriage assembly 40 during actuation along the length of the track assembly 32. When the trailing plunger 208 (i.e., the plunger 208 on the right) encounters the trigger cam 56 on the right of the carriage assembly 40, the inward surface 310 of the trailing plunger 208 engages with the outward surface 324 of the first leg 280 of the trigger cam 56 at the right of FIGS. 7A-8B (e.g., a rearward trigger cam 56). As the trailing plunger 208 physically contacts the rearward trigger cam 56, the shuttle assembly 36 continues to actuate from right-to-left, thereby inducing or causing a clockwise rotation of the trigger cam 56 about the rotation axis defined by the cam rod 204. As the shuttle assembly 36 continues to actuate along the track assembly 32, the trigger cam 56 becomes pinned or otherwise physically confined between the trailing plunger 208 and an end or edge of the guide tab 314 that is immediately adjacent to the trigger cam 56. Accordingly, an inward surface 326 of the first leg 280 of the trigger cam 56 may come into physical contact with the guide tab 314. The induced rotation of the right or rearward trigger cam 56 by the trailing plunger 208 is translated into a corresponding clockwise rotation of the left or forward trigger cam 56 as a result of the coupling of the forward and rearward trigger cams 56 by way of the first and second bars 294, 298 of the linkage assembly 290. Accordingly, one of the trigger cams 56 is pinned, positioned, or otherwise confined between one of the plungers 208 and an adjacent surface of the guide tab 314 while the other of the trigger cams 56 is positioned outward of the left or leading plunger 208 such that the leading plunger 208 is positioned between the first leg 280 of the trigger cam 56 and an adjacent surface of the guide tab 314. The angular displacement through which the trigger cams 56 are actuated by the trailing plunger 208 can be about sixty-degrees (60°). However, the present disclosure is not so limited. Rather, the angular displacement through which the trigger cams 56 are actuated by the trailing plunger 208 can in the range of greater than zero-degrees (0°) to less than ninety-degrees (90°). For example, the angular displacement through which the trigger cams 56 are actuated by the trailing plunger 208 can be greater than about five-degrees (5°), greater than about ten-degrees (10°), greater than about fifteen-degrees (15°), greater than about twenty-degrees (20°), greater than about thirty-degrees (30°), greater than about forty-degrees (40°), greater than about fifty-degrees (50°), greater than about sixty-degrees (60°), greater than about seventy-degrees (70°), greater than about eighty-degrees (80°), less than about ninety-degrees (90°), less than about eighty-five-degrees (85°), less than about eighty-degrees (80°), less than about seventy-five-degrees (75°), less than about seventy-degrees (70°), and/or combinations or ranges thereof.

Referring still further to FIGS. 6-9B, in instances where the trigger cam 56 is rotated in the counter-clockwise direction (see FIGS. 9A-9B) about the rotational axis that is defined by the cam rod 204, the shuttle assembly 36 is actuated from left-to-right from a region of the track assembly 32 that is not immediately below the carriage assembly 40 with the plungers 208 biased toward the extended position. With the plungers 208 in the extended position and the shuttle assembly 36 actuating from left-to-right in FIGS. 9A-9B, as the shuttle assembly 36 approaches a locked carriage assembly 40 the angled upper surface 318 of the leading plunger 208 (i.e., the plunger 208 on the right) engages with the trigger cam 56, which can actuate the plunger 208 toward the retracted position. Alternatively, the lock assembly 48 can be provided with power or otherwise energized to retract the leading plunger 208 toward the retracted position. As the shuttle assembly 36 continues to actuate underneath the locked carriage assembly 40, the leading plunger 208 may remain in an at least partially retracted position by way of interaction with an underside of the guide tab 314 of the associated carriage assembly 40 or as a result of the lock assembly 48 being powered or otherwise energized to move the plunger 208 toward the retracted position. When the trailing plunger 208 (i.e., the plunger 208 on the left) encounters the trigger cam 56 on the left of the carriage assembly 40, the inward surface 310 of the trailing plunger 208 engages with the outward surface 324 of the first leg 280 of the trigger cam 56 at the left of FIGS. 9A-9B (e.g., a forward trigger cam 56). As the trailing plunger 208 physically contacts the forward trigger cam 56, the shuttle assembly 36 continues to actuate from left-to-right, thereby inducing or causing a counter-clockwise rotation of the trigger cam 56 about the rotation axis defined by the cam rod 204. As the shuttle assembly 36 continues to actuate along the track assembly 32, the trigger cam 56 becomes pinned or otherwise physically confined between the trailing plunger 208 and the end or edge of the guide tab 314 that is immediately adjacent to the trigger cam 56. The induced rotation of the left or forward trigger cam 56 by the trailing plunger 208 is translated into a corresponding counter-clockwise rotation of the right or rearward trigger cam 56 as a result of the coupling of the forward and rearward trigger cams 56 by way of the first and second bars 294, 298 of the linkage assembly 290. Accordingly, one of the trigger cams 56 is pinned, positioned, or otherwise confined between one of the plungers 208 and an adjacent surface of the guide tab 314 while the other of the trigger cams 56 is positioned outward of the right or leading plunger 208 such that the leading plunger 208 is positioned between the first leg 280 of the trigger cam 56 and an adjacent surface of the guide tab 314. It is noted that the terms leading and trailing plungers 208 are in reference to a current actuation direction of the shuttle assembly 36 and are not intended to be absolute designations. Rather, if the shuttle assembly 36 is actuated in a fore-and-aft or longitudinal direction with respect to the vehicle 20, then the fore plunger 208 may be referred to as the leading plunger 208 during actuation in the fore direction. Similarly, if the shuttle assembly 36 is actuated in the fore-and-aft direct or longitudinal direction with respect to the vehicle 20, then the fore plunger 208 may be referred to as the trailing plunger 208 during actuation in the aft direction. Further, if the shuttle assembly 36 is actuated in the fore-and-aft or longitudinal direction with respect to the vehicle 20, then the aft plunger 208 may be referred to as the leading plunger 208 during actuation in the aft direction. Similarly, if the shuttle assembly 36 is actuated in the fore-and-aft direct or longitudinal direction with respect to the vehicle 20, then the aft plunger 208 may be referred to as the trailing plunger 208 during actuation in the fore direction. The angular displacement through which the trigger cams 56 are actuated by the trailing plunger 208 can be about sixty-degrees (60°). However, the present disclosure is not so limited. Rather, the angular displacement through which the trigger cams 56 are actuated by the trailing plunger 208 can in the range of greater than zero-degrees (0°) to less than ninety-degrees (90°). For example, the angular displacement through which the trigger cams 56 are actuated by the trailing plunger 208 can be greater than about five-degrees (5°), greater than about ten-degrees (10°), greater than about fifteen-degrees (15°), greater than about twenty-degrees (20°), greater than about thirty-degrees (30°), greater than about forty-degrees (40°), greater than about fifty-degrees (50°), greater than about sixty-degrees (60°), greater than about seventy-degrees (70°), greater than about eighty-degrees (80°), less than about ninety-degrees (90°), less than about eighty-five-degrees (85°), less than about eighty-degrees (80°), less than about seventy-five-degrees (75°), less than about seventy-degrees (70°), and/or combinations or ranges thereof.

Referring again to FIGS. 6-9B, the carriage assembly 40 is biased to the locked position. That is, the carriage assembly 40 can be provided with a biasing member that encourages engagement between the arcuate ends 196 of the lock arms 192 and the recesses 164 between the retention ribs 160. Accordingly, absent an external force, such as that initiated by the plunger 208 of the shuttle assembly 36, the carriage assembly 40 can remain locked or fixed in a given position along the length of the track assembly 32. The shuttle assembly 36 is provided with the capability to bypass a carriage assembly 40 that is not intended to be moved along the track assembly 32. Such a bypassing can prevent unintentional unlocking of the carriage assembly 40 relative to the track assembly 32. With the construction of the shuttle assembly 36 disclosed herein, the action of bypassing one of the carriage assemblies 40 can be accomplished by energizing one of the lock assemblies 48 such that the plunger 208 is placed in the retracted position or an at least partially retracted position. The remaining lock assembly 48 need not be energized toward the retracted position due to the orientation of the upper surface 318 of the plunger 208. More specifically, providing the plunger 208 with a sloped upper surface 318 allows a resistance to rotation of the trigger assembly 52 (e.g., due to friction between components of the carriage assembly 40) to act against the biasing force provided to the plunger 208 by the lock assembly 48 and ultimately depress the plunger 208 toward the retracted position. Accordingly, one of the plungers 208 of a shuttle assembly 36 can be passively retracted during the bypassing of a carriage assembly 40, while the other of the plungers 208 may be actively retracted during the bypassing of the carriage assembly 40. The passively retracted plunger 208 may be the leading plunger 208 and the actively retracted plunger 208 may be the trailing plunger 208. The plunger 208 that is passively retracted may be maintained in the at least partially retracted position by interaction with an underside of the guide tab 314 and further interaction with the trigger assembly 52 as the leading plunger 208 exits the bypassed carriage assembly 40.

Referring further to FIGS. 6-9B, in various examples, each of the track assemblies 32 may be provided with a single shuttle assembly 36. With a single shuttle assembly 36 traversing a given track assembly 32, it is possible for the shuttle assembly 36 to traverse an entirety of the length of the track assembly 32, or an entirety of an actuatable distance within the track assembly 32, without encountering physical impediments that may result with the use of multiple shuttle assemblies 36 per track assembly 32. Additionally, the shuttle assembly 36 may be programmed or instructed to return to a "home" position that is removed from an immediate vicinity of the carriage assemblies 40 (e.g., not within a common vertical plane with any carriage assembly 40). The "home" position of the shuttle assembly 36 may be at an end of the track assembly 32 (e.g., at a forward end and/or a rearward end). The shuttle assembly 36 may be provided more than one "home" position to return to after completing an actuation task (e.g., forward end of track assembly 32, rearward end of track assembly 32, intermediate position along the track assembly 32 that is between carriage assemblies 40, etc.). By utilizing a "home" position of the shuttle assembly 36 that does not share a cross-sectional plane with a carriage assembly 40, where the cross-sectional plane is taken perpendicularly to an actuation direction of the shuttle assembly 36, it is possible to prevent unintentional or unauthorized unlocking of the carriage assembly 40 relative to the track assembly 32. Accordingly, occupants and/or cargo of the vehicle 20 can be prevented from experiencing a sudden and unexpected actuation of one of the components that are mounted to the track assembly 32.

Referring yet again to FIGS. 6-9B, in some examples, the trigger assembly 52 may be biased to the locked configuration such that, absent external forces on the trigger assembly 52, the trigger assembly 52 and the carriage assembly 40 remain in the locked configuration. The external force that actuates the trigger assembly 52 from the locked configuration to the unlocked configuration can be provided by the plunger 208 of the lock assembly 48. It is contemplated that biasing the trigger assembly 52 to the locked configuration may be accomplished by way of a biasing member (e.g., a spring) that is provided within the carriage assembly 40 or the trigger assembly 52. For example, a torsion spring or a clock spring may be provided on the cam rod 204 that engages with the trigger cam 56 to bias the trigger assembly 52 to the locked configuration. Alternatively, it is contemplated that the biasing of the trigger assembly 52 to the locked configuration may be accomplished by the geometry of the trigger cam 56 and/or the geometry of the actuator cam 60. For example, the apexes 268 of the actuator cam 60 that correspond with the major axis 260 may be angled or otherwise shaped such that, absent maintenance of the external force provided by the plunger 208, the actuator cams 60 may be encouraged to remain in the locked configuration (e.g., by a biasing member that encourages the lock arms 192 to remain engaged with the retention lip 156). Similarly, the first leg 280 and/or the second leg 284 of the trigger cam 56 may be angled or otherwise shaped such that, absent maintenance of the external force provided by the plunger 208, the trigger cam 56 may be encouraged to remain in the locked configuration (e.g., by a biasing member that encourages the lock arms 192 to remain engaged with the retention lip 156). In various examples, the shuttle assembly 36 can be provided with partition brackets 334. The partition brackets 334 can provide a mounting and/or guiding structure to the shuttle assembly 36 components. The partition brackets 334 may also provide a closure to the region of the track assembly 32 where the shuttle assembly 36 is located. Said another way, the partition brackets 334 may prevent unintended or unauthorized access to the shuttle assembly 36 by way of the interior channel 44 of the track assembly 32, particularly when the shuttle assembly 36 is positioned proximate an end of the track assembly 32. The partition brackets 334 may provide a brushing or clearing function to the interior channel 44 of the track assembly 32 such that as the shuttle assembly 36 is actuated along the track assembly 32 the partition brackets 334 may push debris and/or other contaminants to an end of the track assembly 32 such that the debris and/or other contaminants may be removed from the track assembly 32. As will be discussed in further detail below, the shuttle assembly 36 may be driven to actuate along the track assembly 32 by one or more of the motors 248. The motors 248 can in turn drive a drive gear 338 that may be provided with a spur gear 342 that engages with one or more of the first and second drive racks 228, 232.

Figure 10:
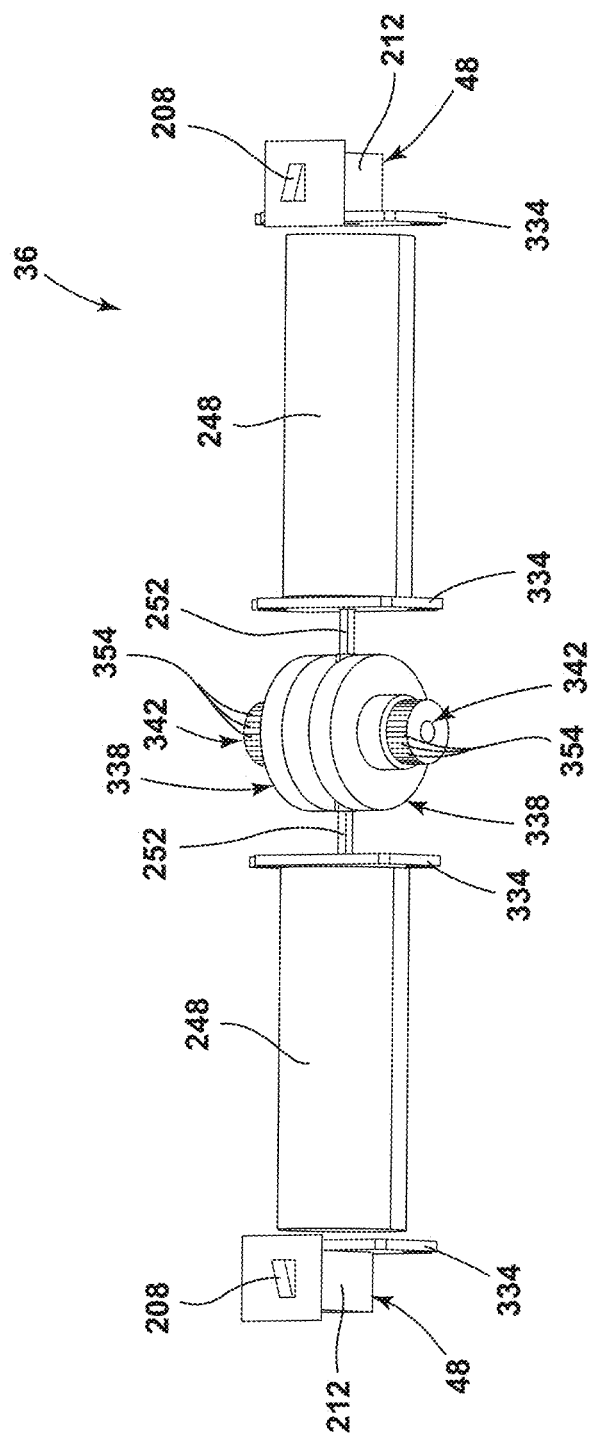
FIG. 10 is a side perspective view of the shuttle assembly, illustrating various components of the shuttle assembly, according to one example.
Figure 11:
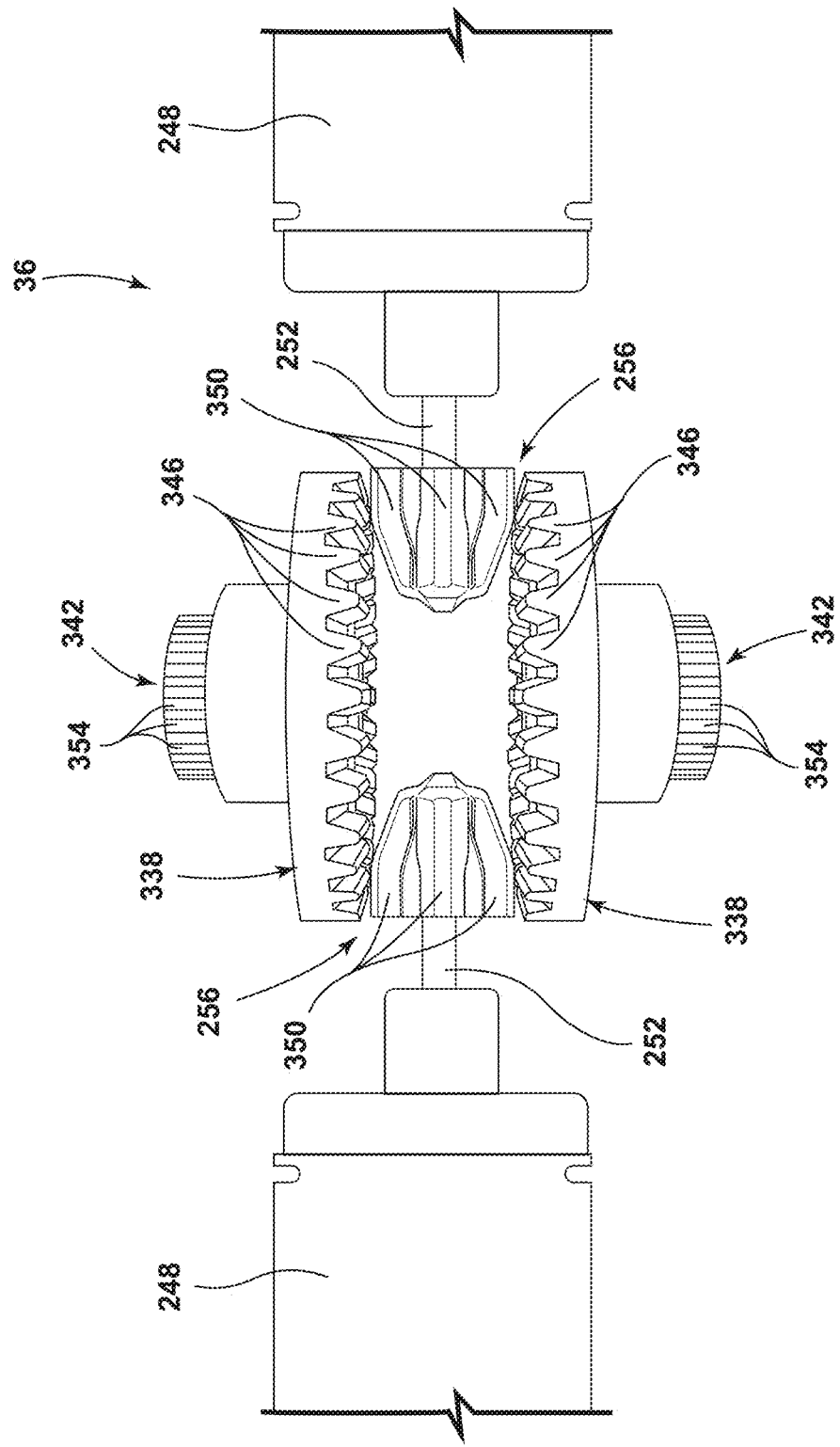
FIG. 11 is a top view of a drive assembly of the shuttle assembly, illustrating motors, pinion gears, drive gears, and spur gears, according to one example.

Referring now to FIGS. 10 and 11, the driveshafts 252 extend from the motors 248 and may each be provided with one of the pinion gears 256. The pinion gears 256 are positioned at an end of the driveshafts 252 that is opposite the motor 248. Said another way, the driveshafts 252 may have a first end and a second end with the first end being directly coupled to the pinion gear 256 and the second end being directly coupled to the motor 248. The pinion gears 256 can extend between two of the drive gears 338 such that the pinion gears 256 are positioned within a space defined by the drive gears 338. A first side of the drive gear 338 can be provided with drive teeth 346. The drive teeth 346 of the drive gear 338 can mesh with pinion teeth 350 of the pinion gear 256. A second side of the drive gear 338 can be provided with one of the spur gears 342. The spur gears 342 can be provided with teeth 354 that engage with one of the drive racks 224 of the track assembly 32. Accordingly, rotational motion imparted to the driveshaft 252 by the motor 248 is translated into rotational motion of the drive gears 338 by way of the interaction between the pinion teeth 350 of the pinion gear 256 and the drive teeth 346 of the drive gear 338. The coupling between the drive gear 338 and the spur gear 342 therefore also translates the rotational motion of the pinion gear 256 into rotational motion of the spur gear 342. The teeth 354 on the spur gear 342 can engage with teeth on the drive rack 224 such that rotational motion of the spur gears 342 results in linear actuation of the shuttle assembly 36 along the track assembly 32. In various examples, the teeth on the first drive rack 228 and the teeth on the second drive rack 232 may be oriented in opposing directions. For example, the teeth on the first drive rack 228 can be provided an a lower surface of the first drive rack 228 while the teeth on the second drive rack 232 can be provided on an upper surface of the second drive rack 232. In such examples, due to the diagonal or cater-cornered relationship between the first and second drive racks 228, 232 and the teeth of the first and second drive racks 228, 232 being oriented toward one another, the motors 248 may counter-rotate relative to one another to effect concerted motion along the track assembly 32 in a simultaneous manner. In such examples, the pinion teeth 350 on each of the pinion gears 256 can mesh with the drive teeth 346 on each of the drive gears 338. In some examples, one of the motors 248 may drive one of the drive gears 338 in a first direction while the other of the motors 248 drives the other of the drive gears 338 in a second direction. Said another way, the shuttle assembly 36 can be provided with a first motor 248 that drives a first drive gear 338 and a second motor 248 that drives a second drive gear 338. The first motor 248 may drive the first drive gear 338 to rotate in a manner that is mutually exclusive from the driven rotation of the second drive gear 338 imparted by the second motor 248. Accordingly, the first motor 248 and the first drive gear 338 may be responsible for driving the shuttle assembly 36 in a first direction along the track assembly 32 while the second motor 248 and the second drive gear 338 are responsible for driving the shuttle assembly 36 in a second direction along the track assembly 32, with the first and second directions being opposite to one another e.g., fore and aft actuation along a longitudinal axis of the vehicle 20).

Referring again to FIGS. 10 and 11, it is noted that the drive gears 338 are shown spaced apart from the pinion gears 256 for illustrative purposes. However, the pinion gears 256 can each engage with, or mesh with, each of the drive gears 338 such that the pinion gears 256 can work in a concerted manner to effect actuation of the shuttle assembly 36 along the track assembly 32, despite the counter-rotation of the pinion gears 256 relative to one another. That is, each of the pinion gears 256 may be rotating in a clockwise manner relative to their respective drive shafts 252, however, due to the mirrored arrangement of the pinion gears 256 relative to one another, the pinion gears 256 counter-rotate relative to one another. This relative counter-rotation of the pinion gears 256 in turn results in counter-rotation of the drive gears 338 and the spur gears 342. In some examples, the drive gears 338 may be spaced apart from one another with only one of the pinion gears 256 engaging with each of the drive gears 338. Such an arrangement may be employed, for example, when teeth provided on the first and second drive racks 228, 232 are provided on a common side, rather than opposing sides, of the first and second drive racks 228, 232. For example, the first and second drive racks 228, 232 may be positioned in adjacent corners of the interior channel 44 of the track assembly 32 with the teeth of the first and second drive racks 228, 232 positioned on a common side of both the first drive rack 228 and the second drive rack 232 (e.g., a top side, a bottom side, a right side, or a left side). In such an arrangement, a first pinion gear 256 and a first drive gear 338 may be responsible for actuation of the shuttle assembly 36 in a first direction (e.g., a fore direction) while a second pinion gear 256 and a second drive gear 338 are responsible for actuation of the shuttle assembly 36 in a second direction (e.g., an aft direction). It is contemplated that in such an arrangement it is possible for the first and second pinion gears 256 to work in concert to effect actuation of the shuttle assembly 36 by having the first and second pinion gears 256 rotate in a common direction relative to one another and counter-rotate relative to their respective drive shafts 252.

Modifications of the disclosure will occur to those skilled in the art and to those who make or use the concepts disclosed herein. Therefore, it is understood that the embodiments shown in the drawings and described above are merely for illustrative purposes and not intended to limit the scope of the disclosure, which is defined by the following claims as interpreted according to the principles of patent law, including the doctrine of equivalents.

It will be understood by one having ordinary skill in the art that construction of the described concepts, and other components, is not limited to any specific material. Other exemplary embodiments of the concepts disclosed herein may be formed from a wide variety of materials, unless described otherwise herein.

For purposes of this disclosure, the term "coupled" (in all of its forms: couple, coupling, coupled, etc.) generally means the joining of two components (electrical or mechanical) directly or indirectly to one another. Such joining may be stationary in nature or movable in nature. Such joining may be achieved with the two components (electrical or mechanical) and any additional intermediate members being integrally formed as a single unitary body with one another or with the two components. Such joining may be permanent in nature, or may be removable or releasable in nature, unless otherwise stated.

It is also important to note that the construction and arrangement of the elements of the disclosure, as shown in the exemplary embodiments, is illustrative only. Although only a few embodiments of the present innovations have been described in detail in this disclosure, those skilled in the art who review this disclosure will readily appreciate that many modifications are possible (e.g., variations in sizes, dimensions, structures, shapes and proportions of the various elements, values of parameters, mounting arrangements, use of materials, colors, orientations, etc.) without materially departing from the novel teachings and advantages of the subject matter recited. For example, elements shown as integrally formed may be constructed of multiple parts, or elements shown as multiple parts may be integrally formed, the operation of the interfaces may be reversed or otherwise varied, the length or width of the structures and/or members or connector or other elements of the system may be varied, and the nature or numeral of adjustment positions provided between the elements may be varied. It should be rioted that the elements and/or assemblies of the system may be constructed from any of a wide variety of materials that provide sufficient strength or durability, in any of a wide variety of colors, textures, and combinations. Accordingly, all such modifications are intended to be included within the scope of the present innovations. Other substitutions, modifications, changes, and omissions may be made in the design, operating conditions, and arrangement of the desired and other exemplary embodiments without departing from the spirit of the present innovations.

It will be understood that any described processes, or steps within described processes, may be combined with other disclosed processes or steps to form structures within the scope of the present disclosure. The exemplary structures and processes disclosed herein are for illustrative purposes and are not to be construed as limiting.

It is also to be understood that variations and modifications can be made on the aforementioned structures and methods without departing from the concepts of the present disclosure, and further, it is to be understood that such concepts are intended to be covered by the following claims, unless these claims, by their language, expressly state otherwise.

What is claimed is:

1. A rail assembly, comprising:
   a track assembly defining an interior channel, the track assembly comprising a guide protrusion and a retention lip;
   a shuttle assembly received within the interior channel, the shuttle assembly comprising a lock assembly; and
   a carriage assembly coupled to the track assembly, the carriage assembly comprising:
      a support bracket extending to engage with the guide protrusion of the track assembly, wherein the support bracket comprises a support plate, a guide plate, a first support arm, and a second support arm, wherein the first support arm and the second support arm each extend between the support plate and the guide plate, and wherein the first support arm and the second support arm define an aperture therebetween;
      a lock plate extending to engage with the retention lip of the track assembly, wherein the lock plate comprises a lock arm positioned within the aperture defined by the first support arm and the second support arm, and wherein the lock arm engages with the retention lip to retain the carriage assembly in a given position along the track assembly; and
      a trigger assembly, the trigger assembly comprising:
         a trigger cam; and
         an actuator cam coupled to the trigger cam, wherein the actuator cam is configured to actuate the carriage assembly between a locked configuration relative to the track assembly and an unlocked configurations relative to the track assembly.

2. The rail assembly of claim 1, wherein the shuttle assembly comprises:
   a motor;
   a driveshaft extending from the motor, the driveshaft having a first end and a second end, wherein the motor is positioned at the first end, and wherein the second end is opposite the first end;
   a pinion gear positioned at the second end of the driveshaft;
   a drive gear that meshes with the pinion gear on a first side of the drive gear; and
   a spur gear positioned on a second side of the drive gear.

3. The rail assembly of claim 2, wherein the track assembly comprises:
   a drive rack that is engaged by the spur gear of the shuttle assembly.

4. The rail assembly of claim 1, wherein rotational motion of the trigger cam is configured to be translated into rotational motion of the actuator cam.

5. The rail assembly of claim 4, wherein the trigger cam and the actuator cam are coupled to one another by a cam rod.

6. The rail assembly of claim 4, wherein the actuator cam comprises a major axis and a minor axis such that the actuator cam is oblong in shape.

7. The rail assembly of claim 6, wherein orienting the minor axis of the actuator cam in a substantially perpendicular relationship with a longitudinal axis of the track assembly corresponds to the locked configuration, and wherein orienting the major axis of the actuator cam in a substantially non-parallel relationship with the longitudinal axis of the track assembly corresponds to the unlocked configuration.

8. The rail assembly of claim 7, wherein the lock assembly comprises a body and a plunger, and wherein the plunger is movable between an extended position relative to the body and a retracted positions relative to the body.

9. The rail assembly of claim 8, wherein the plunger is biased to the extended position.

10. The rail assembly of claim 9, wherein contact between the plunger and the trigger cam is configured to initiates rotational motion of the trigger cam in one of a clockwise direction about a rotation axis defined by the cam rod and a counter-clockwise direction about the rotation axis defined by the cam rod.

11. The rail assembly of claim 10, wherein actuation of the shuttle assembly along the track assembly after contact has been made between the plunger and the trigger cam results in physical containment of the trigger cam between the plunger and a guide tab of the carriage assembly.

12. The rail assembly of claim 11, wherein the physical containment of the trigger cam between the plunger and the guide tab is configured to maintains the carriage assembly in the unlocked configuration, and wherein the physical interaction between the plunger and the carriage assembly is configured to enables movement of the shuttle assembly along the track assembly to be translated into corresponding movement of the carriage assembly along the track assembly.

13. The rail assembly of claim 1, wherein the lock arms comprises an arcuate ends that engages with an underside of the retention lip, wherein the retention lip comprises a first retention rib and a second retention ribs, wherein the first retention rib and the second retention rib define a recess therebetween, and wherein the recess receives the arcuate end of the lock arm.

14. A rail assembly, comprising:
a track assembly defining an interior channel, the track assembly comprising a guide protrusion and a retention lip;
a shuttle assembly received within the interior channel, the shuttle assembly comprising a lock assembly, the lock assembly comprising:
a body; and
a plunger, the plunger being movable between an extended position relative to the body and a retracted positions relative to the body; and
a carriage assembly coupled to the track assembly, the carriage assembly comprising:
a support bracket extending to engage with the guide protrusion of the track assembly, the support bracket comprising a support plate, a guide plate, a first support arm, and a second support arm, wherein the first support arm and the second support arm each extend between the support plate and the guide plate, wherein the first support arm and the second support arm define an aperture therebetween;
a lock plate extending to engage with the retention lip of the track assembly, the lock plate comprising a lock arm positioned within the aperture defined by the first support arm and the second support arm, wherein the lock arm engages with the retention lip to retain the carriage assembly in a given position along the track assembly, wherein the lock arm comprises an arcuate end that engages with an underside of the retention lip, wherein the retention lip comprises a first retention rib and a second retention rib, wherein the first retention rib and the second retention rib define a recess therebetween, and wherein the recess receives the arcuate end of the lock arm; and
a trigger assembly, the trigger assembly comprising:
a trigger cam; and
an actuator cam coupled to the trigger cam by a cam rod, wherein rotational motion of the trigger cam is configured to be translated into rotational motion of the actuator cam, the actuator cam comprising a major axis and a minor axis such that the actuator cam is oblong in shape, wherein the actuator cam is configured to actuate the carriage assembly between a locked configuration relative to the track assembly and an unlocked configurations relative to the track assembly, and wherein orienting the minor axis of the actuator cam in a substantially perpendicular relationship with a longitudinal axis of the track assembly corresponds to the locked configuration, and wherein orienting the major axis of the actuator cam in a substantially non-parallel relationship with the longitudinal axis of the track assembly corresponds to the unlocked configuration.

15. The rail assembly of claim 14, wherein the shuttle assembly comprises:
a motor;
a driveshaft extending from the motor, the driveshaft having a first end and a second end, wherein the motor is positioned at the first end, and wherein the second end is opposite the first end;
a pinion gear positioned at the second end of the driveshaft;
a drive gear that meshes with the pinion gear on a first side of the drive gear; and
a spur gear positioned on a second side of the drive gear.

16. The rail assembly of claim 15, wherein the track assembly comprises:
a drive rack that is engaged by the spur gear of the shuttle assembly.

17. The rail assembly of claim 14, wherein the plunger is biased to the extended position.

18. The rail assembly of claim 17, wherein contact between the plunger and the trigger cam is configured to initiate rotational motion of the trigger cam in one of a clockwise direction about a rotation axis defined by the cam rod and a counter-clockwise direction about the rotation axis defined by the cam rod.

19. The rail assembly of claim 18, wherein actuation of the shuttle assembly along the track assembly after contact has been made between the plunger and the trigger cam results in physical containment of the trigger cam between the plunger and a guide tab of the carriage assembly.

20. The rail assembly of claim 19, wherein the physical containment of the trigger cam between the plunger and the guide tab is configured to maintain the carriage assembly in the unlocked configuration, and wherein the physical interaction between the plunger and the carriage assembly is configured to enable movement of the shuttle assembly along the track assembly to be translated into corresponding movement of the carriage assembly along the track assembly.

* * * * *

UNITED STATES PATENT AND TRADEMARK OFFICE
CERTIFICATE OF CORRECTION

PATENT NO. : 11,104,248 B2  
APPLICATION NO. : 16/595829  
DATED : August 31, 2021  
INVENTOR(S) : Scott et al.

Page 1 of 1

It is certified that error appears in the above-identified patent and that said Letters Patent is hereby corrected as shown below:

In the Claims

Column 20:  
Claim 1, Line 42;  
"configurations" should be --configuration--.

Column 21:  
Claim 8, Line 12;  
"positions" should be --position--.  
Claim 10, Line 16;  
"initiates" should be --initiate--.  
Claim 12, Line 28;  
"maintains" should be --maintain--.  
Claim 12, Line 31;  
"enables" should be --enable--.  
Claim 13, Line 35;  
"arms" should be --arm--.  
Claim 13, Line 36;  
"ends" should be --end--.  
Claim 13, Line 38;  
"ribs" should be --rib--.  
Claim 14, Line 52;  
"positions" should be --position--.

Column 22:  
Claim 14, Lines 21-22;  
"configurations" should be --configuration--.

Signed and Sealed this  
Fifteenth Day of February, 2022

Drew Hirshfeld  
*Performing the Functions and Duties of the*  
*Under Secretary of Commerce for Intellectual Property and*  
*Director of the United States Patent and Trademark Office*